(12) United States Patent
Jung et al.

(10) Patent No.: US 7,136,688 B2
(45) Date of Patent: Nov. 14, 2006

(54) SLIDE TYPE CELLULAR PHONE AND SLIDING METHOD THEREOF

(75) Inventors: Sung Tai Jung, Suwon-Shi (KR); Tae Hyeong Lim, Suwon-Shi (KR); Ki Young Lee, Kyungki-Do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 357 days.

(21) Appl. No.: 10/690,405

(22) Filed: Oct. 20, 2003

(65) Prior Publication Data

US 2004/0198477 A1 Oct. 7, 2004

(30) Foreign Application Priority Data

Apr. 1, 2003 (KR) .................. 10-2003-0020627
Apr. 1, 2003 (KR) .................. 10-2003-0020628
Apr. 1, 2003 (KR) .................. 10-2003-0020629

(51) Int. Cl.
*H04M 1/00* (2006.01)
(52) U.S. Cl. .................. 455/575.4; 379/433.12
(58) Field of Classification Search ............ 455/575.4, 455/575.1; 379/433.12
See application file for complete search history.

(56) References Cited

U.S. PATENT DOCUMENTS 6,748,249 B1 * 6/2004 Eromaki et al. ......... 455/575.4
6,980,840 B1 * 12/2005 Kim et al. ............... 455/575.4
6,993,128 B1 * 1/2006 Eromaki ................ 379/433.12
2003/0227564 A1 * 12/2003 Lim ........................ 348/375

* cited by examiner

Primary Examiner—George Eng
Assistant Examiner—Julie E Stein
(74) Attorney, Agent, or Firm—Darby & Darby

(57) ABSTRACT

A slide type cellular phone having two separate bodies automatically or manually sliding with respect to each other includes a first main body having a motor with a shaft, an elastic member elastically supporting the motor, and a switch activating the motor, a power transmitting unit coupled to the shaft of the motor to receive a rotation power from the motor, a pinion coupled to the power transmitting unit to be rotated by the rotation power, a second main body slidably coupled to the first main body, having a rack coupled to the pinion, and sliding with respect to the first main body according to movements of the pinion and the rack, and a sliding detecting unit detecting a termination of a sliding operation of the second main body to control the motor. The pinion, the rack, and the power transmitting member to operates by a rotation of the motor to automatically or manually slide the second main body with respect to the first main body, thereby providing a more convenient cellular phone.

12 Claims, 22 Drawing Sheets

SLIDE TYPE CELLULAR PHONE AND SLIDING METHOD THEREOF

CROSS-REFERENCE TO RELATED APPLICATION

This application claims to benefit of Korean Patent Application Nos. 2003-20627 filed Apr. 1, 2003, 2003-20628 filed Apr. 1, 2003, and 2003-20629 filed Apr. 1, 2003, in the Korean Intellectual Property Office, the disclosures of which are incorporated herein by reference.

BACKGROUND OF THE INVENTION

1. Field of the Invention

The present invention relates to a cellular phone, and more particularly, to a slide type cellular phone having two separate bodies which manually or automatically slide with respect to each other, and a method thereof.

2. Description of the Related Art

Generally, a cellular phone (wireless or mobile phone) is a terminal which provided with a mobile service which is useful in a predetermined distance of a service area of the mobile service by assigning a portion of telephone lines of subscribers located in the service area to mobile phone lines. While a conventional telecommunication service is only useful in a limited service area using phone line numbers of telephone lines, the cellular phone is used for phone calls without limiting the limited service area using logical numbers regardless of the phone line numbers of the telephone lines.

The cellular phone is very compact to carry with and very convenient to use with, and demands increase tremendously. Moreover, the cellular phone has been developed to be minimized in size and to be multi-functional in operation to satisfy users having various demands.

Generally, the cellular phone is classified into one of a bar type having a key pad exposed to an outside of the cellular phone, a flip type covering the key pad using a cover, and a folder type having a folder folded onto a main body. Currently, the folder type cellular phone having the folder unfolded from and folded onto the main body becomes popular.

FIG. 1 is a perspective view of a conventional folder type cellular phone. As shown in FIG. 1, the cellular phone includes a main body 10 and a folder 20. The main body includes a plurality of main components for receiving and transmitting operations, a microphone 12, a key pad 14m and a battery pack B to supply electrical power to the cellular phone.

The folder 20 includes a speaker 22, a display window 24 displaying various communication information and functional information, and other components.

In the folder type cellular phone, the folder 20 is rotatably connected to the main body 10 through a rotation unit 30 having a circular shape to hinge with respect to the main body 10. The main body 10 is uncovered and covered by the folder 20 according to a rotation of the rotation unit 30 in opposite (forward and reverse) directions.

The folder 20 is folded to cover the main body 10 in a standby mode and is unfolded to uncover the main body 10 when the cellular phone is in a calling mode and a receiving mode.

However, the folder type cellular phone is disadvantageous to unfold the folder 20 from the main body 10 by inserting a user finger between the folder 20 and the main body 10 to unfold the folder 20 from the main body 10.

In order to solve the above problem, another cellular phone having a folder automatically folded onto and unfolded from the main body has been developed. However, a new demand on a new type of the cellular phone increases since the user is fed up with the conventional folder type cellular phone as the conventional folder type cellular type becomes popular.

SUMMARY OF THE INVENTION

To solve the above and/or other problems, it is as aspect of the present invention to provide a slide type cellular phone having a folder which does not hinge with respect to a main body, is very convenient to automatically or manually slide with respect to the main body, terminates a sliding operation by detecting a movement of the folder without pushing a button or a switch.

It is another aspect of the present invention to provide a cellular phone and a method to terminate a sliding operation of a second body of the cellular phone by detecting an overload current flowing a motor which is activated in the sliding operation of sliding the second body with respect to a first body of the cellular phone.

It is another aspect of the present invention to provide a cellular phone and a method to automatically terminate a sliding operation of a second body of the cellular phone according to a predetermined period time or a number of activation times of a motor.

It is another aspect of the present invention to provide a cellular phone and a method to easily or conveniently activate a motor using a second body sliding with respect to a first body of the cellular phone as a motor activation switch by which the motor is activated.

Additional aspects and advantages of the invention will be set forth in part in the description which follows and, in part, will be obvious from the description, or may be learned by practice of the invention.

To achieve the above and/or other aspects, there is provided a cellular phone including a first main body having a motor with a shaft, an elastic member elastically supporting the motor, and a switch activating the motor, a power transmitting unit coupled to the shaft of the motor to receive a rotation power from the motor, a pinion coupled to the power transmitting unit to be rotated by the rotation power, a second main body slidably coupled to the first main body, having a rack coupled to the pinion, and sliding with respect to the first main body according to movements of the pinion and the rack, and a sliding detecting unit detecting a termination of a sliding operation of the second main body to control the motor.

According to another aspect of the present invention, a cellular phone includes a first main body having a speaker, a second main body having a microphone, and slidably coupled to the first main body, a sliding unit rotatably disposed in the first main body, and rotating to generate a friction force with the second main body to slide the second main body with respect to the first main body, a fixed unit disposed on the first main body to rotatably support the sliding unit, and a position detecting unit detecting a sliding state of the second main body to control a movement of the sliding unit.

According to another aspect of the present invention, a cellular phone includes a first main body having a speaker, a second main body having a microphone, and slidably coupled to the first main body, a driving unit disposed in the first main body, having a rotation shaft having a power transmitting member formed with a pair of members selectively binding each other and releasing each other at one end of the driving unit, and having an elastic member disposed at the other end of the driving unit to have an elastic force to elastically support one of the power source and the power transmitting member, a friction member rotating together with the power transmitting member in a single body to generate a friction force with the second main body to slide the second main body with respect to the first main body, a fixed unit disposed on the friction member to rotatably support the friction member, and a position detecting unit detecting a sliding state of the second main body to control the driving unit.

According to another aspect of the present invention, a cellular phone includes a first main body having a motor with a shaft, a pinion coupled to the shaft, and a switch activating the motor, a second main body having a rack coupled to the pinion to slide with respect to the first main body, and a motor control unit electrically connected to the motor and the switch of the first main body to control a power to be supplied to the motor through the switch and cutting off the power from the motor when an overload of the motor is generated, so that an sliding operation of the second main body is terminated.

According to another aspect of the present invention, a cellular phone includes a first main body having a motor with a shaft, a pinion coupled to the shaft, and a switch activating the motor, a second main body having a rack coupled to the pinion to slide with respect to the first main body, and a motor control unit electrically connected to the motor and the switch of the first main body to control a power to be supplied to the motor through the switch for a predetermined period of time according to an activation of the switch so that an sliding operation of the second main body is automatically terminated.

According to another aspect of the present invention, a cellular phone includes a first main body having a motor with a shaft, a pinion coupled to the shaft, and a switch driving the motor, a second main body having a rack coupled to the pinion to slide with respect to the first main body, and a motor control unit electrically connected to the motor and the switch of the first main body to control a power to be supplied to the motor through the switch for a predetermined number of rotations according to an activation of the switch so that an sliding operation of the second main body is automatically terminated.

According to another aspect of the present invention, a cellular phone includes a first main body having a motor with a shaft, a pinion coupled to the shaft, and a switch driving the motor, a second main body having a rack coupled to the pinion to slide with respect to the first main body, and a motor control unit electrically connected to the motor and the switch of the first main body to control a power to be supplied to the motor through the switch, driving the motor by supplying the power to the motor according to a reverse electromotive force generated from the motor when the motor is rotated by an external force other than an activation of the switch, and cutting off the power from the motor when an overload is generated from the motor so that an sliding operation of the second main body is automatically terminated.

To achieve the above and/or other aspects, there is provided a method used with a cellular phone having a first main body and a second main body, the method including outputting a driving signal to a motor to drive the motor by activation of a switch to slide the second main body with respect to the first main body, detecting an overload from the motor when the sliding of the second main body is prevented, and cutting off the driving signal from the motor when the overload of the motor is detected, so that the sliding of the second main body is terminated.

According to another aspect of the present invention, a method used with a cellular phone having a first main body and a second main body includes outputting a driving signal to a motor to drive the motor by activation of a switch to slide the second main body with respect to the first main body, outputting an activating signal to a timer to allow the timer to count a period of time according to a start of the sliding of the second main body, determining whether the counting of the period of time is finished, and cutting off the driving signal from the motor upon determining that the counting of the period of time is finished, so that the sliding of the second main body is terminated.

According to another aspect of the present invention, a method used with a cellular phone having a first main body and a second main body includes outputting a driving signal to a motor to drive the motor by activation of a switch to slide the second main body with respect to the first main body, outputting an activating signal to a counter to allow the counter to count a number of rotations of the motor according to a start of the sliding of the second main body, determining whether the counting of the number of the rotations of the motor is finished, and cutting off the driving signal from the motor upon determining that the counting of the number of rotations of the motor is finished, so that the sliding of the second main body is terminated.

According to another aspect of the present invention, a method used with a cellular phone having a first main body and a second main body includes manually sliding the second main body with respect to the first main body by exerting an external force on the second main body to manually rotate a motor disposed on the first main body, detecting a reverse electromotive force generated from the motor when the motor is manually rotated by the external force other than an activation of a switch, outputting a driving signal to a motor to drive the motor upon detection of the reverse electromotive force of the motor to automatically slide the second main body with respect to the first main body, detecting an overload generating from the motor when the sliding of the second main body is prevented, and cutting off the driving signal from the motor upon according to the detection of the overload, so that the sliding of the second main body is terminated.

BRIEF DESCRIPTION OF THE DRAWINGS

These and/or other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
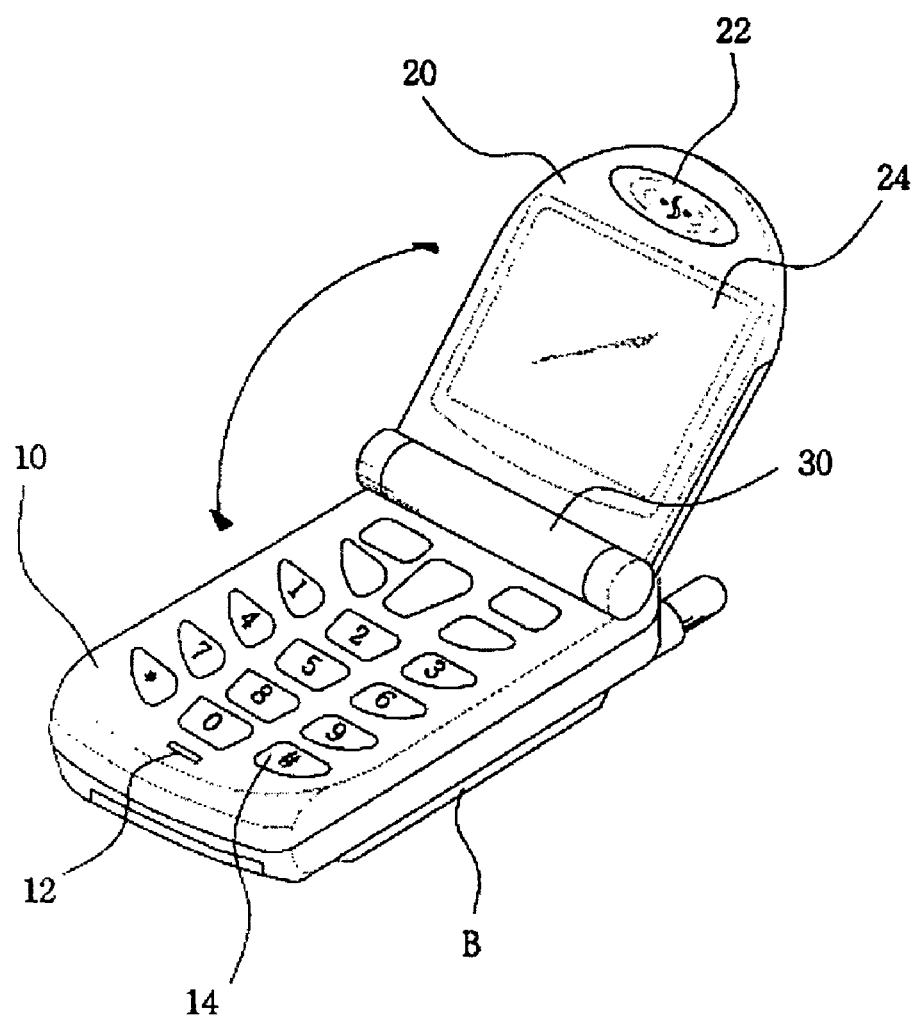
FIG. 1 is a perspective view of a conventional folder type cellular phone.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures. Hereinafter, a cellular (wireless or mobile) phone will be explained with reference with the following drawings according to an embodiment of the present invention.

Figure 2:
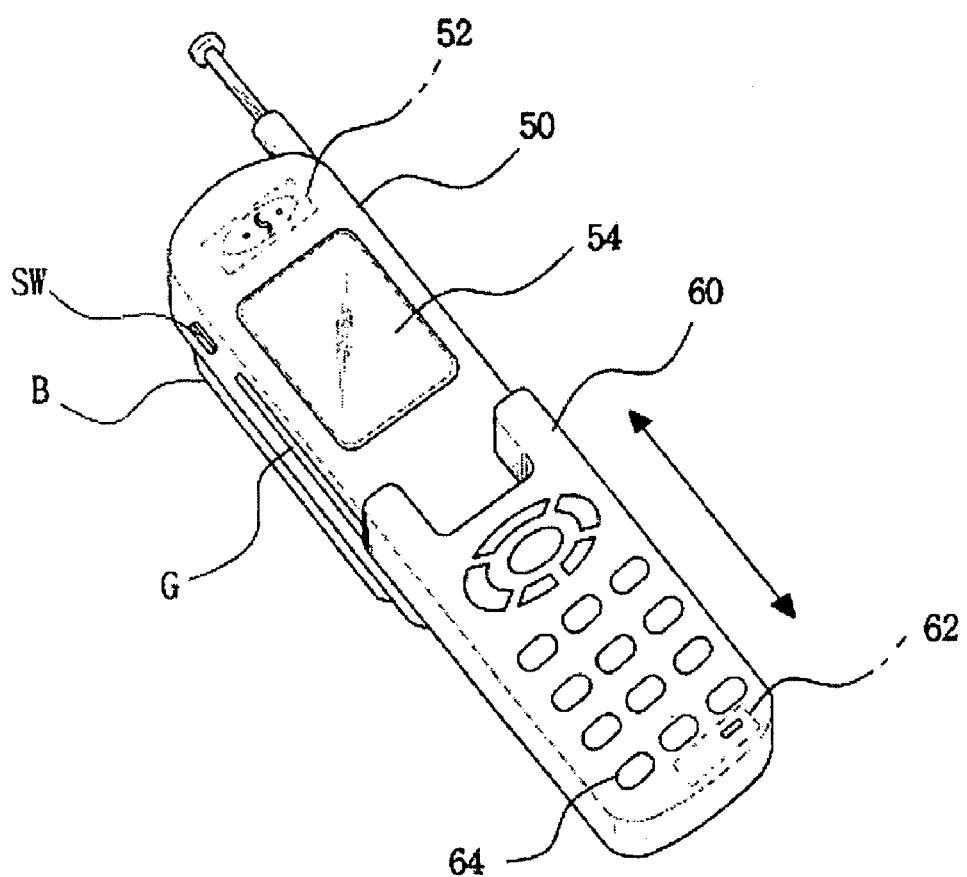
FIG. 2 is a perspective view of a slide type cellular phone according to an embodiment of the present invention.
Figure 3:
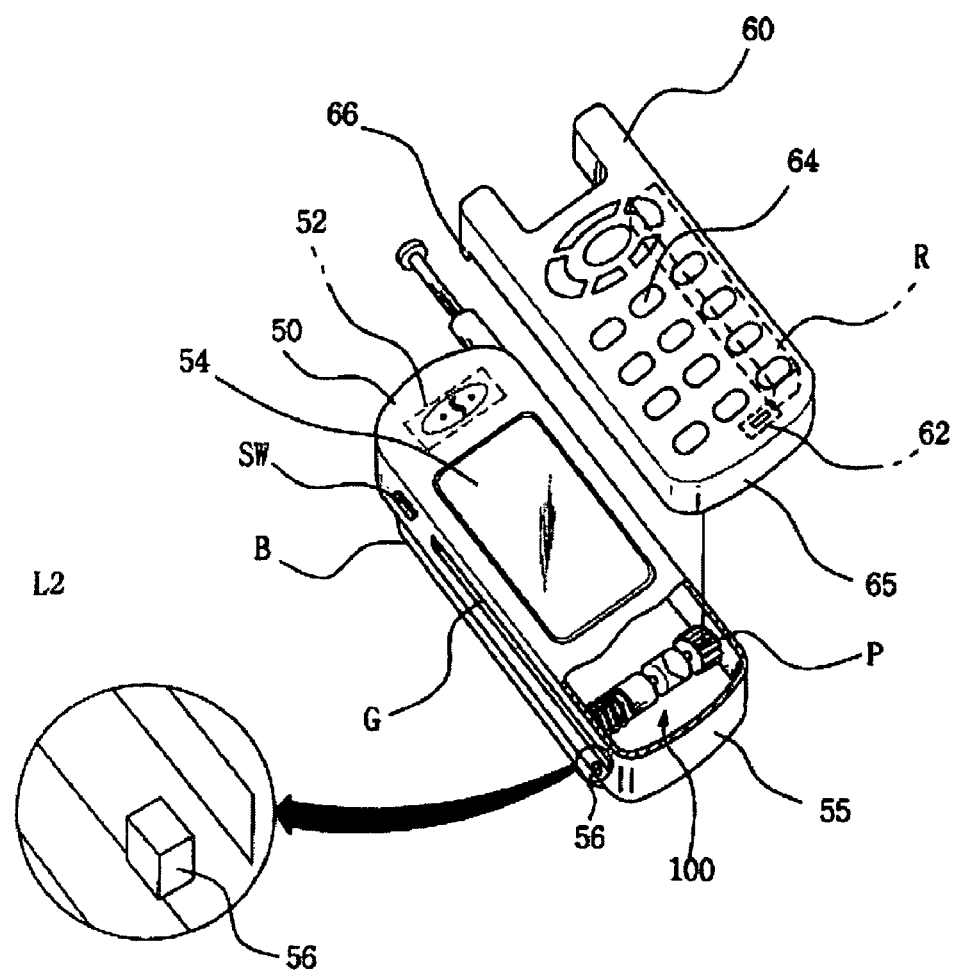
FIG. 3 is an exploded view of the slide type cellular phone shown in FIG. 2.
Figure 4:
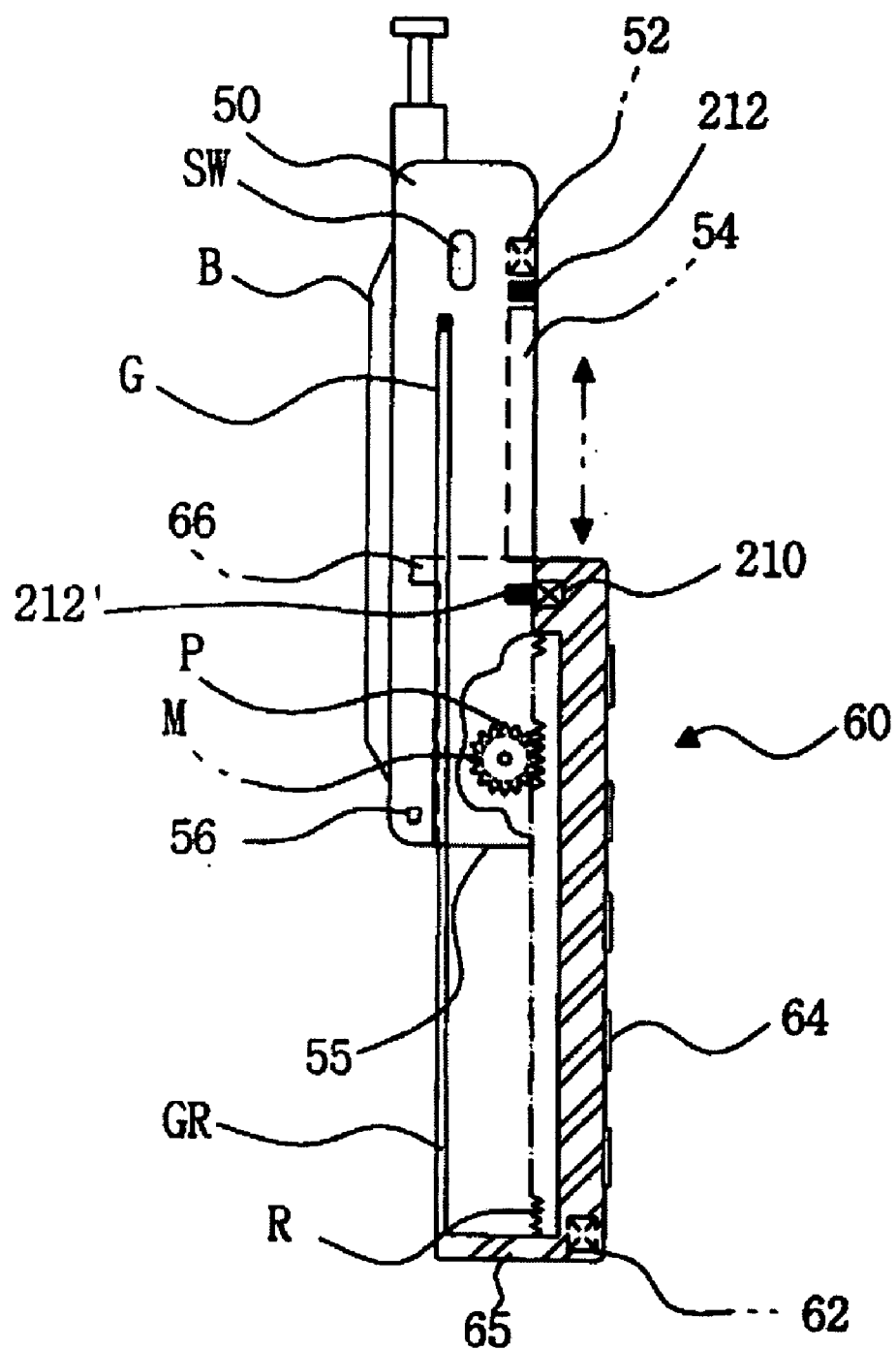
FIG. 4 is a side view having a partial cross-sectional view showing a portion of the slide type cellular phone shown in FIG. 2.
Figure 5:
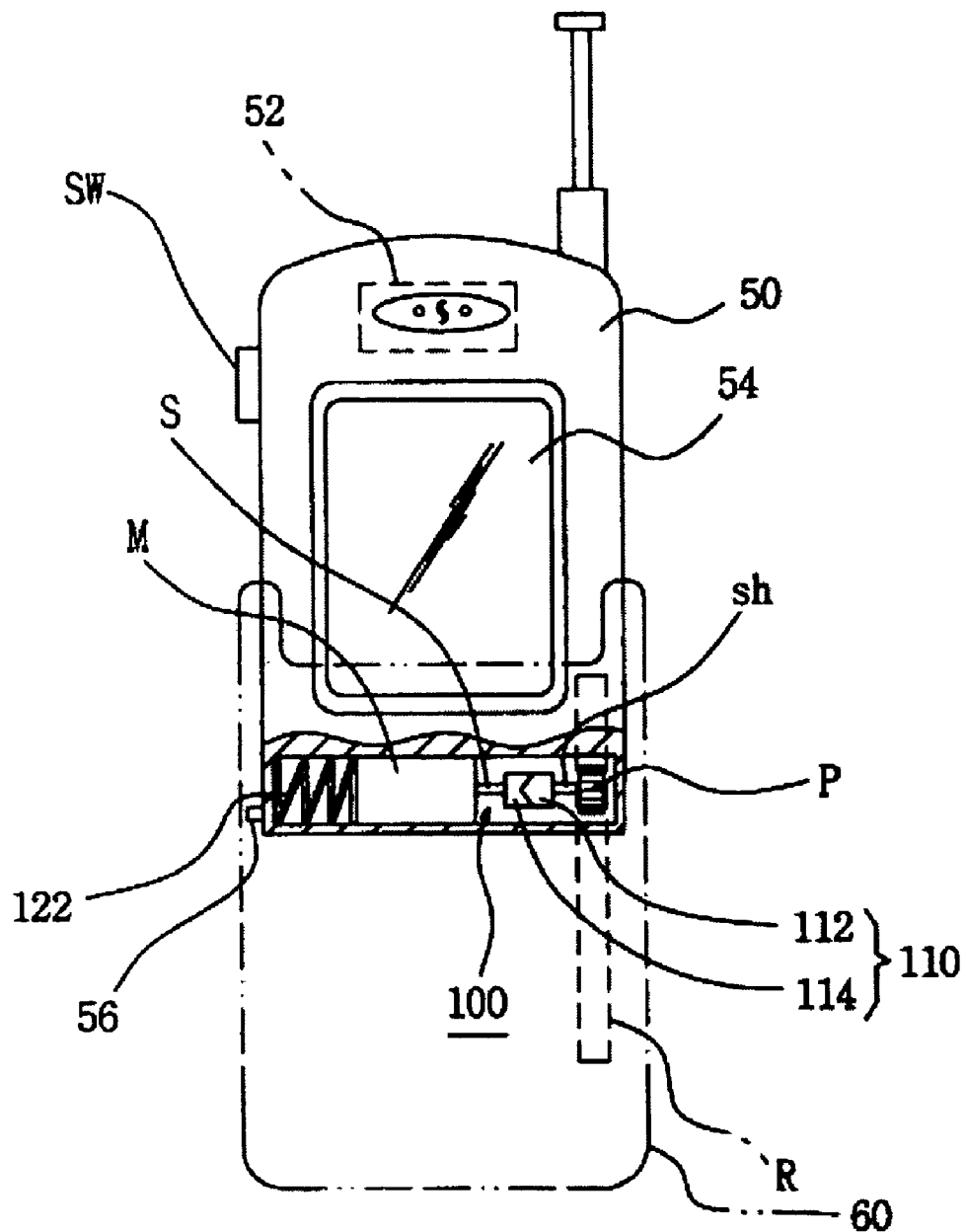
FIG. 5 is a front view having a partial sectional view showing a sliding unit of the slide type cellular phone shown in FIG. 2.
Figure 6A:
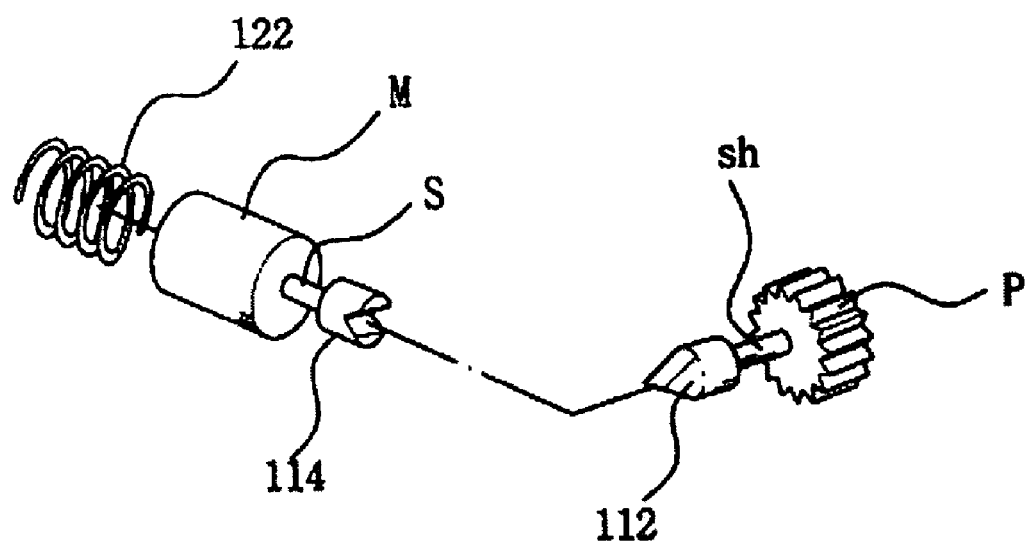
FIG. 6A is an exploded view showing a sliding unit of the slide type cellular phone shown in FIG. 2.
Figure 6B:
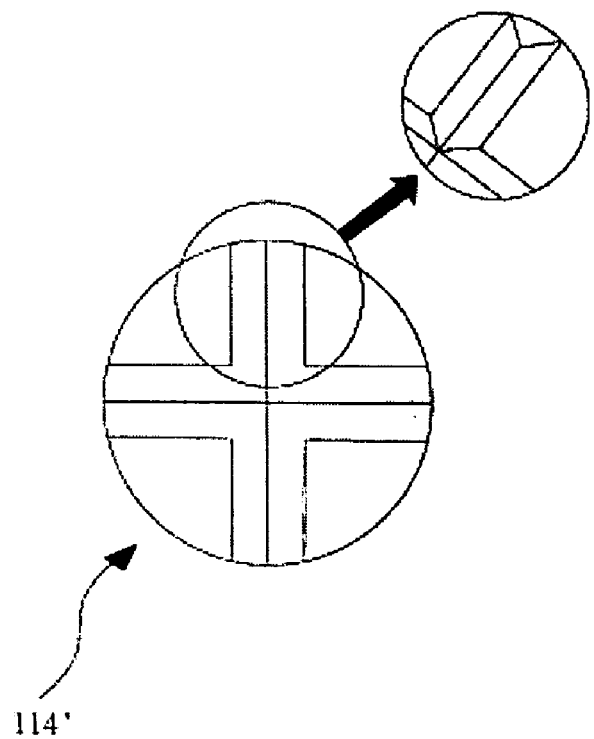
FIG. 6B is a view showing a female cam of the sliding unit of the slide type cellular phone of FIG. 6A according to another embodiment of the present invention.
Figure 7:
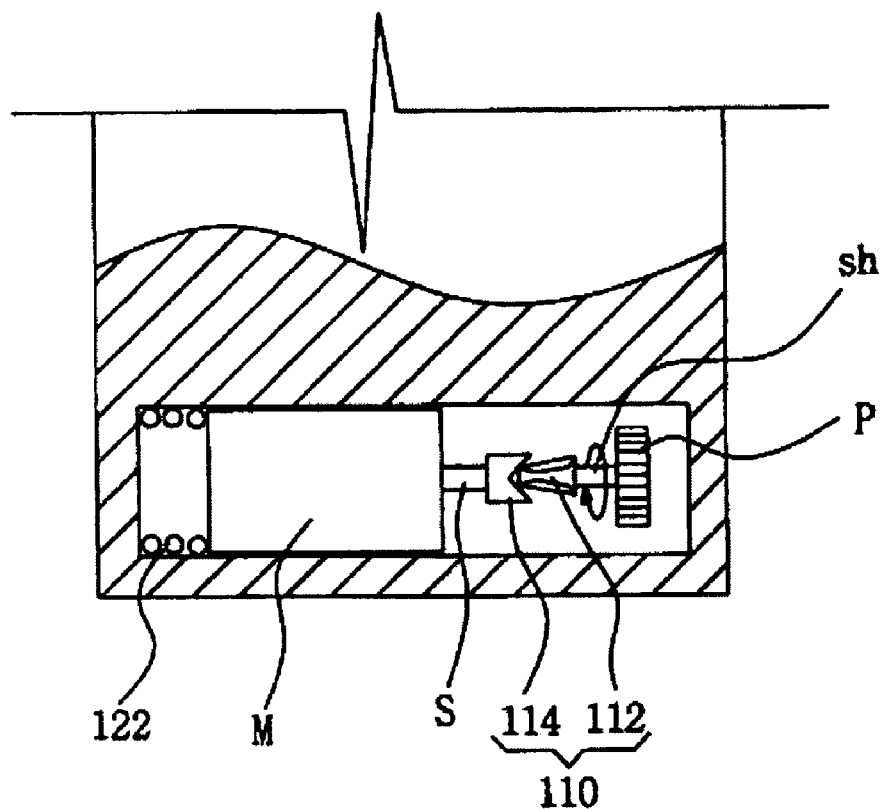
FIG. 7 is a front view having a partial sectional view showing a portion of the sliding unit of the slide type cellular phone of FIG. 5 in a manual sliding mode.

FIG. 2 is a perspective view of a slide type cellular (wireless or mobile) phone according to an embodiment of the present invention, FIG. 3 is an exploded view of the slide type cellular phone shown in FIG. 2, FIG. 4 is a side view having a partial cross-sectional view showing a portion of the slide type cellular phone shown in FIG. 2, FIG. 5 is a front view having a partial sectional view showing a sliding unit of the slide type cellular phone shown in FIG. 2, FIG. 6A is an exploded view showing the sliding unit of the slide type cellular phone shown in FIG. 2, FIG. 6B is a view showing a female cam of the sliding unit of the slide type cellular phone of FIG. 6A according to another embodiment of the present invention, and FIG. 7 is a front view having a partial sectional view showing a portion of the sliding unit of the slide type cellular phone of FIG. 5 in a manual sliding mode.

Referring to FIGS. 2 through 7, the cellular phone includes a first main body 50 and a second main body 60 which is slidably coupled to the first main body 50.

The first main body 50 includes various receiving and transmitting components, a speaker 52, and a battery pack B as a power source.

The first main body 50 further includes a display window 54 displaying various telecommunication and function information, a guide G guiding the second main body to slide with respect to the first main body 50, and a switch SW to control sliding of the second main body 60.

The first main body 50 is electrically connected to the switch SW and includes a sliding (driving) unit 100 having a motor (driving source) contained in the first main body 50 to rotate in forward and reverse directions and having an end of the motor M elastically supported by an elastic member 122 as shown in FIG. 5, a pinion P rotated by the motor M, and a power transmitting member 110 connecting the pinion P and the motor M.

Here, the motor M is a geared motor having a satellite-gear-type speed reducing device having a reduction ratio of 500:1 to 600:1 to amplify a torque of the motor M.

The pinion P receives a rotation power from the motor M through the power transmitting member 110, and the power transmitting member 110 includes a pair of elements to be coupled between the motor M and the pinion P.

The power transmitting member 110 includes a male cam 112 having projection surfaces formed on both sides thereof and a female cam 114 having a groove corresponding to the projection surfaces as shown in FIGS. 5 and 6A.

The female cam 114 is connected to a first shaft S of the motor M, and the male cam 112 is connected to a second shaft sh of the pinion P. Since the female cam 114 and the male cam 112 are connected to the motor M and the pinion P, respectively, a rotation force of the motor M is transmitted to the pinion P.

The male cam 112 and the female cam 114 are maintained in a coupling state due to the elastic member 122 elastically supporting one end of the motor M. In the coupling state, the male cam 112 is maintained to be coupled to the female cam 114.

That is, since the motor M is elastically supported using the elastic force of the elastic member 122, the male cam 112 is inserted into the female cam 114, thereby binding the male cam 112 and the female cam 114.

Accordingly, the male cam 112 is rotated by a binding power of the female cam when the female cam 114 is rotated by a rotation of the motor M, and the rotation power of the motor M is transmitted to the pinion P according to a rotation of the male cam 112.

The groove of the female cam 114 can be formed in a "–" shape as shown in FIG. 6A and in a "+" shape as shown in FIG. 6B.

The second main body 60 includes a microphone 62, a key pad having a plurality of keys, various components (not shown), and a rail GR which is inserted into (disposed on) the guide G of the first main body 50.

The second main body 60 includes a rack R formed on a side thereof in a shape of a rectangular parallelepiped as shown in FIG. 4, to be coupled to the pinion P operating with the motor M of the first main body 50.

The rack R is coupled to the pinion P to reciprocate according to a rotation of the pinion P, and according to a movement of the rack R, the second main body 60 slides with respect to the first main body 50.

A separation prevention unit is provided to prevent the second main body 60 from being removed from the first main body 50 when the first main body 50 is uncovered (opened) according to a sliding movement between the first and second main bodies 50 and 60. The separation prevention unit includes a stopper 56 having a structure protruding from a lower portion of the first main body 50 and a coupling (protruding) member 66 protruding from an upper portion of the second main body 60.

The stopper 56 and the coupling member 66 are in a coupling state, in which the stopper 56 and the coupling member 66 are coupled to each other when the second main body 60 slides with respect to the first main body 50 to open the first main body 50. Due to the coupling state between the stopper and the coupling member 66, the second main body 60 is prevented from being separated from the first main body 50.

On the contrary, when the second main body 60 slides to cover the first main body 50, a downward-sidewall 65 of the second main body 60 contacts an upward-sidewall 55 of the first main body 50 to terminate the sliding movement of the first and second main bodies 50 and 60, thereby preventing the second main body 60 from being separated from the first main body 50.

That is, the second main body 60 is prevented from being separated from the first main body 50 since the downward-sidewall 65 of the second main body 60 contacts the upward-sidewall 55 of the first main body 50.

A sliding detecting unit (210, 212, 212') is installed on the first and second main bodies 50 and 60 to detect a termination of a sliding operation of the second main body 60. The sliding detecting unit (210, 212, 212') is electrically connected to a control IC controlling a rotation of the motor M and controls the control IC to stop the rotation of the motor M to terminate the sliding operation when a completion of the sliding operation of the second main body 60 is detected.

The sliding detecting unit (210, 212, 212') includes first and second terminals 212, 212' installed on upper and lower sides of the first main body 50 as shown in FIG. 4, and a third terminal 210 installed on a portion of the second main body 60 to correspond to the first and second terminals 212, 212'. The third terminal 210 contacts one of the first and second electrical terminals 212, 212' to detect the sliding operation of the second main body 60. The sliding detecting unit (210, 212, 212') can be formed of contact-type sensors which generate a detecting (switching) signal when contacting each other, or noncontact-type sensors which generate the detecting signal without contact when becomes closer to each other.

Here, when the sliding detecting unit (210, 212, 212') is formed of the contact-type sensors, the first and second terminals 212. 212' of the first main body 50 are formed of a pressure switch which operates by an external pressure to generate the detecting signal. The third terminal 210 of the second main body 60 is made of a small-sized projection-type contact terminal exerting the external pressure on one of the first and second terminals 212, 212'.

When the sliding detecting unit (210, 212, 212') is formed of the noncontact-type sensors, the first and second terminals 212, 212' of the first main body 50 is formed of a hall sensor generating the detecting signal when detecting a magnetic field, and the third terminal 210 of the second main body 60 is formed of a magnet generating the magnetic field.

As described above, in the slide-type cellular phone having the above structure according to the embodiment of the present invention shown in FIGS. 2 through 7, the control IC outputs a driving signal to the motor M forming the sliding unit 100 according to a switch signal of a switch to automatically slide the second main body 60 with respect to the first main body 50.

The motor M includes a reduction unit having satellite gears to increase a torque, and according to the rotation of the motor M, the elastic member 122 becomes in an extending (unwinding) state to elastically support the motor M to maintain an coupling state of the power transmitting member 110.

That is, when the elastic member 110 is in the extending state, the elastic member 122 elastically supports the motor M to bind the female cam 114 and the male cam 112 of the power transmitting member 110.

According to the coupling of the power transmitting member 110, the rotation power of the motor M is transmitted to the pinion P to be rotated, and the rotation of the pinion P causes the rack R to reciprocate to allow the second main body 60 to slide with respect to the first main body 50.

Here, in a case that the second main body 60 slides to open the first main body 50, the second terminal 212' and the third terminal 210 installed on the first main body 50 and the second main body 60, respectively, are disposed to face (contact) each other to generate the detecting signal when the sliding operation of the second main body 60 is finished to open the first main body 50.

Therefore, the sliding detecting unit (210, 212, 212') generates the detecting signal to the control IC to terminate the rotation of the motor M, thereby terminating the sliding operation of the second main body 60.

In a case that the second main body 60 slides to close (cover) the first main body 50, the sliding operation of the second main body 60 is finished according to the same manner as the above-described opening operation.

That is, when the second main body 60 completes the closing operation of closing the first main body 50, the first and third terminals 212 and 210 of the sliding detecting unit (210, 212, 212') installed on the first main body 50 are disposed to face (contact) each other to generate the detecting signal, and according to the detecting signal, the control IC stops the motor M not to rotate, thereby terminating the sliding operation of the second main body 60.

Here, when the sliding operation of opening the first main body 50 is finished, the stopper 56 of the first main body 50 is coupled to the coupling member 66 of the second main body 60 to prevent the first and second main bodies 50, 60 from sliding further and from being separated. When the sliding operation of closing the first main body 50 is finished, the upward sidewall 55 of the first main body 50 is coupled to the downward side wall 65 to prevent the sliding operation of sliding the second main body 60 further.

It is possible that noise may be generated from the cellular phone according to contact between the rack R and the pinion P in the sliding operation of the second main body 60, and the rack R and the pinion P can be made of a rubber material to reduce the noise.

When a groove formed on the female cam 114 is a "+" shape as shown in FIG. 6B, a protruding portion of the male cam 112 is coupled to the groove of the female cam 114 in every 90 i Æ.

According to every rotation of the male cam 112 by 90 i ♂, the protruding portion of the male cam 112 is coupled to the groove of the female cam 114. Therefore, the male cam 112 rotates by 360 i Æ, the protruding portion of the male cam 112 is coupled to the groove of the female cam 114 four times. Accordingly, noise generated from rotations of the male and female cam 112, 114 during the sliding operation of sliding the second main body 60 with respect to the first main body 50 is more frequently generated in a case of the "+" shape of the groove of the female cam 114 than in a case of the "−" shape of the groove of the female cam 114. However, the sliding operation is more smoothly performed in the case of the "+" shape of the groove of the female cam 114 than in the case of the "−" shape of the groove of the female cam 114.

As described above, the automatic sliding operation is performed according to the switch signal of the switch of the cellular phone. Hereinafter, a manual sliding operation will be described.

A user manually starts to slide the second main body 60 with respect to the first main body 50, thereby causing the rack R to slide to rotate the pinion P.

Then, the male cam 112 of the power transmitting member 110 coupled to the pinion P is rotated to push the female cam 114. When the female cam 114 is pushed according to a contact between the male cam 112 and a taper surface of the groove of the female cam 114, the motor M is pressed to be slid with respect to the first main body 50 by the female cam 114.

The elastic member 122 elastically supporting the motor M is compressed by the pressed Motor M, and the motor M is slid together with the female cam 114, thereby releasing the male cam 112 from a binding state with the female cam 114.

While the male cam 112 pivots against the groove of the female cam 114, the male cam 112 rotates together with the pinion P, and a rotation of the pinion P causes the second main body 60 to manually slide with respect to the first main body 50.

That is, the second main body 60 is enabled to slide by a rotation of the pinion P with respect to the first main body 50 in a case that the male cam 112 is able to rotate with respect to the female cam 114 and the motor M by the compression of the elastic member 122.

The first shaft S of the motor M is not rotated since the male cam 112 and the female cam 114 are separated due to the compression of the elastic member 122.

The pinion P is able to rotate and the rack R is able to slide with respect to the first main body 50 due to the elastic member 122 which is able to be compressed. Therefore, the elastic member 122 should be designed to have an elastic characteristic (force) which is greater than the rotation force of the motor M and an external force causing the second main body 60 to manually slide with respect to the first main body 50.

Accordingly, the elastic member 122 is in the extension state to elastically support the motor M during the automatic sliding operation, and is deformed to be in the compressed state so that the motor M and the female cam 114 are pushed with respect to the male cam 112 during the manual sliding operation.

Figure 8:
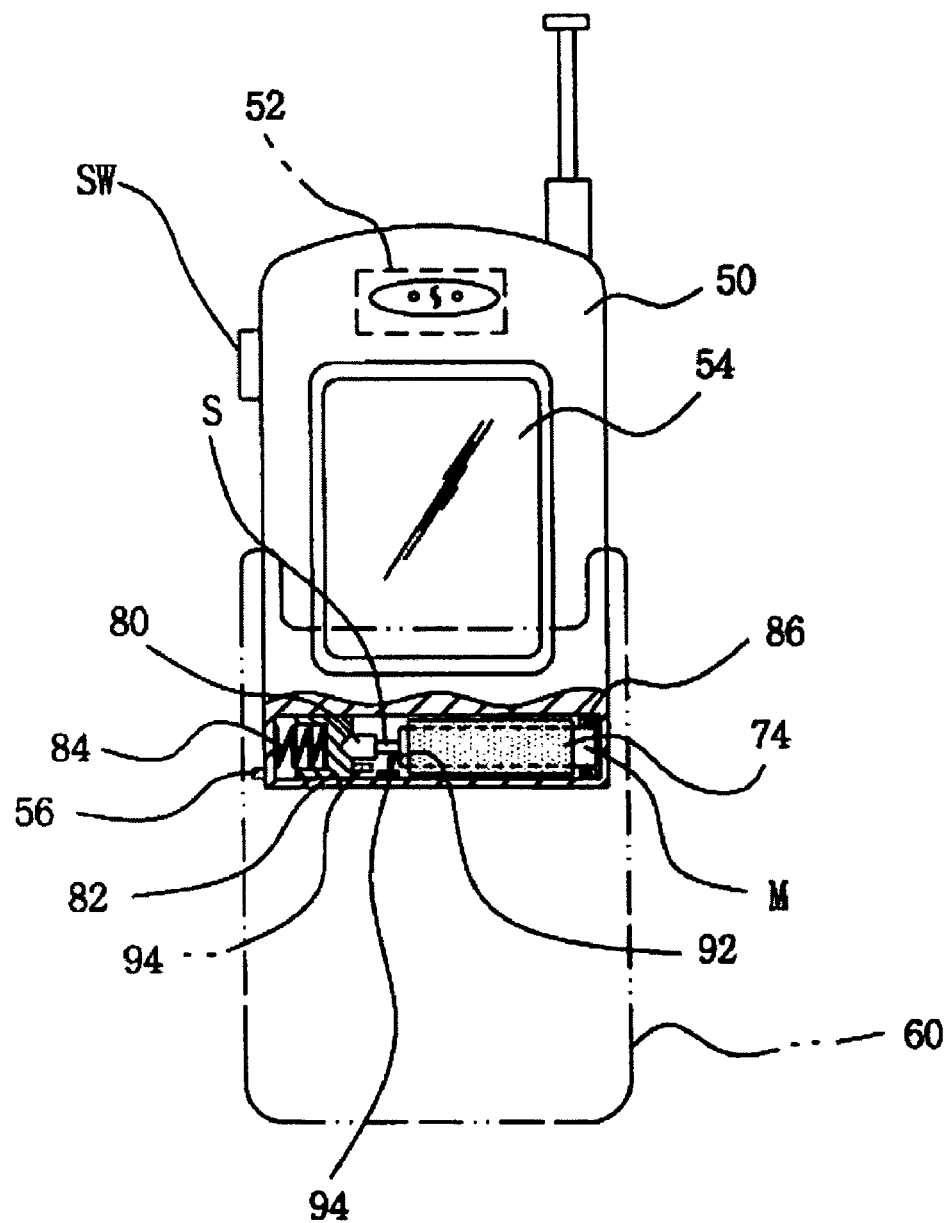
FIG. 8 is a front view having a partial sectional view of another sliding unit of the slide type cellular phone of FIG. 2 according to another embodiment of the present invention.
Figure 9:
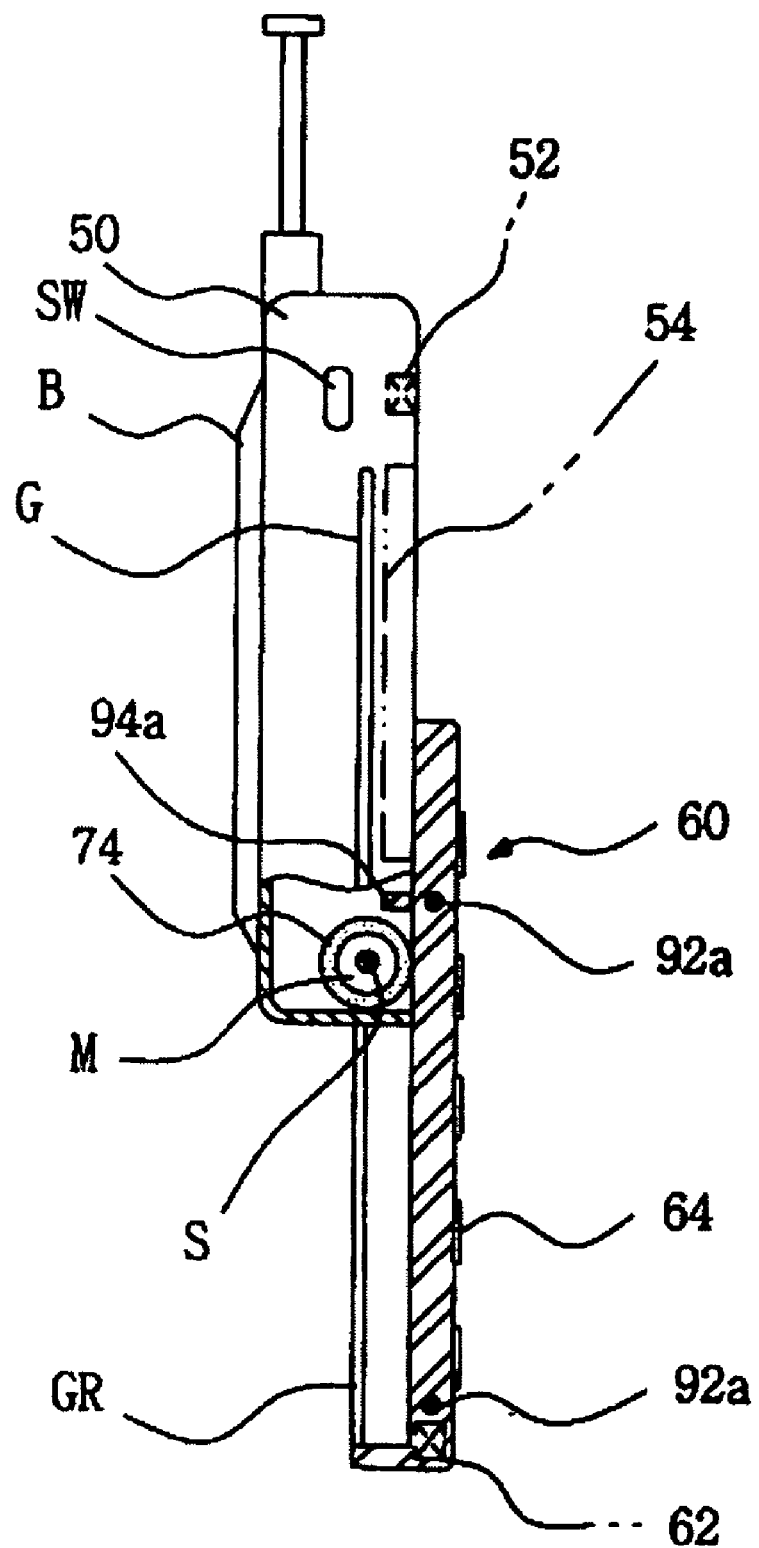
FIG. 9 is a side view having a partial sectional view of the another sliding unit shown in FIG. 8.

FIG. 8 is a front view having a partial sectional view of another sliding unit 100 of the slide type cellular phone of FIG. 2 according to another embodiment of the present invention, and FIG. 9 is a side view having a partial sectional view of the another sliding unit 100 shown in FIG. 8

As shown in FIGS. 8 and 9, the cellular phone includes the first main body 50 and the second main body 60 which is slidable with respect to the first main body 50.

The first main body 50 includes various receiving and transmitting components, a speaker 52, and a battery pack B as a power source.

The first main body 50 further includes a display window 54 displaying various telecommunication and function information, a guide G guiding the second main body to slide with respect to the first main body 50, and a switch SW to control sliding of the second main body 60.

The second main body 60 includes a microphone 62, a key pad having a plurality of keys, various components (not shown), and a rail GR which is inserted into (disposed on) the guide G of the first main body 50.

The switch SW is electrically coupled to the sliding unit 100 which controls the second main body 60 to slide with respect to the first main body 50, and the sliding unit 100 includes the motor M having a circular cylindrical shape and disposed in an inside of the first main body 50 to rotate in forward and reverse directions, and a pulley 74 made of a rubber material and surrounding an outer circumferential surface of the motor M.

The pulley 74 is attached to the motor M, installed in the inside of the first main body 50, and has an outer circumferential surface having a portion contacting a portion of a surface of the second main body 60.

The first shaft S of the motor M is fixedly coupled to a fixed (stationary) unit of the first main body 50, which includes an elastic member 84 and male and female cams 80 and 82 which will be described later, not to be rotatable with respect to the fixing unit. Since the first shaft S of the motor M is firmly secured on the fixed unit, the motor M is rotates, and the pulley 74 attached to the motor M rubs against the second main body 60.

That is, when an electrical power is supplied to the motor M according to the switch signal of the switch SW, the motor M rotates with respect to the first shaft S, the pulley 74 is rotated by a rotation of the motor M to generate a friction force with the second main body 60, and then the friction force causes the second main body 60 to slide with respect to the first main body 50.

The motor M includes a speed reduction unit having satellite gears having a speed reduction ration of 500~600:1 to generate a rotation torque to realize the sliding operation of the second main body 60 with respect to the first main body 50.

In addition, a surface of the pulley 74 attached to the motor M is formed with a plurality of grooves (not shown) in a lengthwise or widthwise direction or a plurality of embossments protruding from the surface of the pulley to increase the friction force.

The fixed unit fixedly coupled to the first shaft S of the motor M includes the male cam 80 and the female cam 82. The male cam 80 includes one end having a projection having tapered surfaces formed on both sides thereof and the other end fixedly coupled to the first shaft S of the motor M.

The female cam 82 includes one end having a groove corresponding to the projection and the other end having a cavity.

The elastic member 84 is disposed in the cavity of the female cam 82 in an extension state while one end of the elastic member 84 is coupled to an inside wall of the first main body 50 and the other end is coupled to a side of the female cam 82 defining the cavity, thereby elastically supporting the female cam 82.

Since the projection of the male cam 80 is inserted into the groove of the female cam 82, the male cam 80 and the female cam 82 maintain bound together without being separated.

Since the elastic member 84 elastically supports the female cam 82 to be elastically coupled to the male cam 80, the male cam 80 is bound to the female cam 82, thereby fixedly coupling the first shaft S of the motor M to the fixed unit.

Accordingly, when the motor M is activated to rotate, the first shaft S of the motor M is not rotated because the first shaft S is bound to the female cam 82. Rather, the motor M rotates with respect to the first shaft S bound to the female cam 82. Therefore, the motor M becomes a rotor while the first shaft S becomes a stator.

In order to prevent a rotation force to rotate the first shaft S (stator) of the motor M with respect to the fixed unit, the female cam 82 needs to overcome the rotation force, and an elastic force of the elastic member 84 to elastically support the female cam 82 should be greater than the rotation force of the first shaft S.

That is, the elastic member 84 has the elastic force greater than the rotation force of the first shaft S.

However, the elastic force of the elastic member 84 should be less than an external force transmitted to the elastic member 84 to compress the elastic member 84 when the external force is generated when the second main body 60 slides with respect to the first main body 50, although the elastic force of the elastic member 84 is greater than the rotation force of the first shaft S.

That is, when a user manually slides the second main body 60 with respect to the first main body 50, the elastic member 84 should be compressed to prevent a breakage of the male cam 80 and the female cam 82.

The sliding operation of the second main body 50 will be explained in more detail hereinafter. When the second main body 60 slides by the user manually, the pulley 74 and the motor M are rotated by the second main body 60, and the rotation of the motor M causes the first shaft S to rotate.

And then, the female cam 82 is about to rotate when the male cam 80 coupled to the first shaft S is rotated. If the elastic member 84 is compressed, the male cam 80 and the female cam 82 are released from each other.

If the elastic member 84 is not compressed, the female cam 82 is bound to the male cam 80, thereby not allowing the second main body 60 to slide with respect to the first main body 50, so that the external force is exerted on the male cam 80 and the female cam 82, and then the male cam 80 and the female cam 82 are damaged and broken down.

However, if the elastic member 84 is compressed to release the male cam 80 and the female cam 82 from each other, the projection of the male cam 82 is released from the groove of the female cam 82 to pivot with respect to the groove of the female cam 82, thereby smoothly rotating the male cam 80 with respect to the female cam 82.

Accordingly, it is possible that the second main body 60 is manually slid with respect to the first main body 50 using the compression of the elastic member 84.

Here, a reference number 86 indicates a bearing having a ring shape inserted around an end portion of the motor M to rotatably support the motor M and enabling the motor M to smoothly rotate.

It is possible that a position detecting unit is provided to detect a state of the sliding operation of the second main body 60 with respect to the first main body 50 to automatically control the rotation of the motor M.

The position detecting unit includes a protrusion 92 mounted on a portion of the motor M or the first shaft S to rotate together with the motor M or the first shaft S, and a position detecting sensor 94 disposed to face the protrusion 92 to detect a rotation state of the protrusion 92 as shown in FIG. 9.

The position detecting sensor 94 is a contact type switch to contact the protrusion 92. However, the invention is not limited thereto. The position detecting sensor 94 may be a noncontact type switch, such as a photo sensor detecting the protrusion 92 using laser. Moreover, the position detecting sensor 94 can be disposed on an inside wall of the first main body 50 or a portion of the female cam 82 which is not rotatable with respect to the first main body 50.

The position detecting sensor 94 is electrically connected to an IC (not shown) which calculates the number of the rotation of the protrusion 92 to control a power of the motor M and the rotation of the motor M.

That is, since the rotation number of the protrusion 92 indicates the rotation number of the motor M, the sliding state of the second main body 60, that is, an open state and a closed state of the first main body 50, is detected by the rotation number of the protrusion 92, that is, the rotation number of the motor M. therefore, the power is supplied to the motor M or the supplying of the power to the motor M is terminated according to the rotation number of the protrusion 92 or the motor M.

The position detecting unit may includes magnets 92*a* mounted on lower and upper portions of the second main body 60 and a magnet detecting sensor 94*a* installed on a portion of the first main body 50 to detect a magnetic field formed by one of the magnets 92*a* as shown in FIG. 9.

If the position detecting unit is provided with the magnets 92*a* and the magnet detecting sensor 94*a* as described above, the magnet detecting sensor 94*a* and one of the magnets 92*a* are disposed to close to each other during the sliding operation of the second main body 60, and the IC connected to the magnet detecting sensor 94*a* controls the rotation of the motor M.

Accordingly, the second main body 60 accurately slides with respect to the first main body 50 to open and close the first main body 50.

As described above, in the cellular phone according to this embodiment of the invention, the sliding operation of the second main body 60 is performed by using the motor M and the pulley 74 as the sliding unit 100. However, the sliding operation can be performed using another embodiment of the present invention as shown in FIG. 10.

Figure 10:
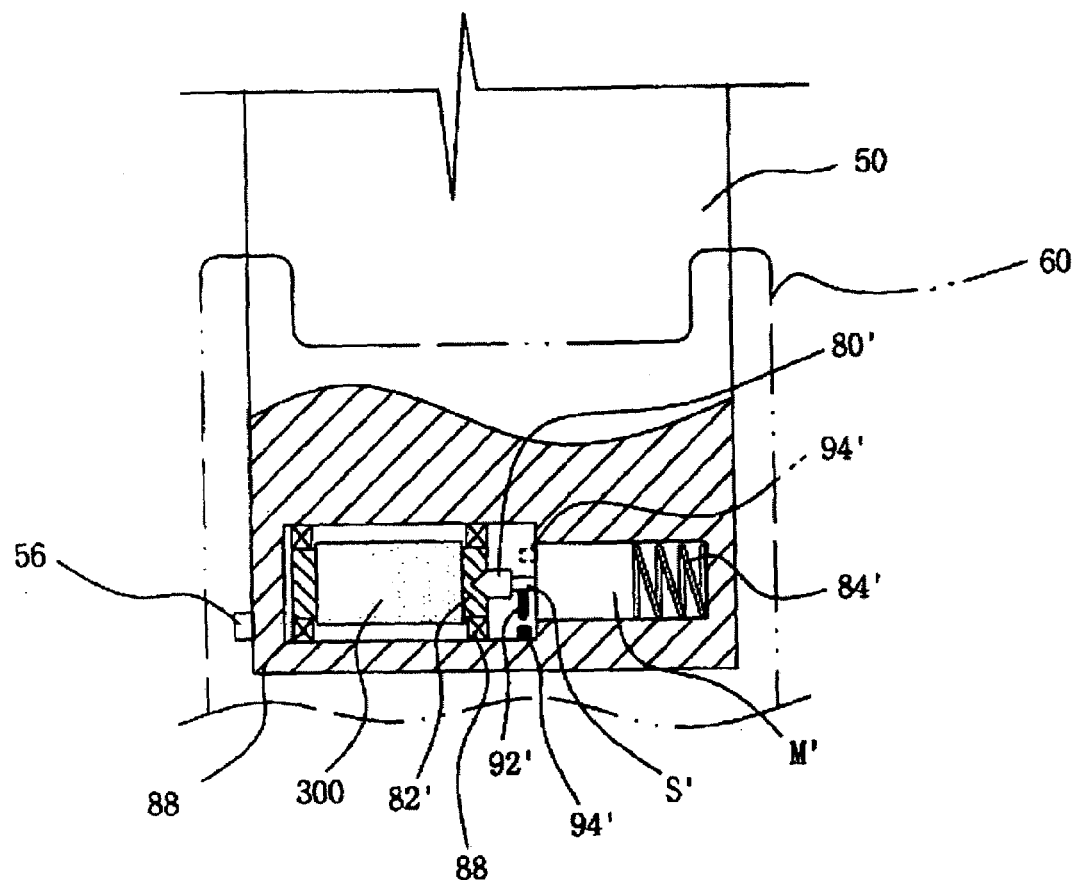
FIG. 10 is a view having a partial sectional view showing another sliding unit of the slide type cellular phone of FIG. 2 according to another embodiment of the present invention.

FIG. 10 is a view having a partial sectional view showing another sliding unit 100 of the slide type cellular phone of FIG. 2 according to another embodiment of the present invention.

The cellular phone includes a motor M' fixedly mounted on an inside of the first main body 50, a power transmitting member (80', 82') coupled to the motor M', and a friction member 300 contacting an inside wall of the second main body 60 to slide the second main body with respect to the first main body 50.

An exterior shape of the motor M' is a hexahedral shape to be installed on the inside of the first main body 50, one end of the motor M' is coupled to an end of the power transmitting member, such as the male cam 80' and the female cam 82', and the other end of the female cam 82' is provided with an elastic member 84' made of a compression spring in an extended state.

The elastic member 84' has one end fixedly coupled to the motor M' and the other end fixedly mounted on the inside wall of the first main body 50 to elastically support the motor M' to bind the male cam 80' and the female cam 82'.

The friction member 300 to slide the second main body 60 may be a pulley made of the rubber material surrounding an outer surface of the female cam 82' or a roller made of the rubber material fixed on the female cam 82'.

The friction member 300 may includes a plurality of grooves formed on an outer surface thereof and a plurality of embossments minutely protruding from the outer surface of the friction member 300 to increase a friction force.

Since the friction member 300 has a portion being close contact with a surface of the second main body 60 to slide the second main body 60 with respect to the first main body 50.

A fixed unit 88, such as a ring-shaped bearing, is mounted on a first side and/or second side of the friction member 300 to rotatably support the friction member 300.

In the cellular phone having the above structure, when an external power is supplied to the motor M', which is the stator, and then, the first shaft S', which is the rotor, is rotated according to a rotation of the motor M'. As a consequence, the male cam 80' and the female cam 82' are rotated to cause a rotation of the friction member 300 which is formed in a single body with the female cam 82'.

When the friction member 300 rotates, the second main body 60 slides with respect to the first main body 50 according to a friction force generating between the friction member 300 and the second main body 60.

In order to automatically control the sliding operation of the second main body 60, the position detecting unit is provided as shown in FIG. 10. The position detecting unit includes a protrusion 92, formed on a first shaft S of the motor M' and a position detecting sensor 94' mounted on the inside wall of the first main body 50.

The position detecting sensor 94' may be mounted on a portion of the motor M' which is indicated with a dotted-lined box rather than the inside wall of the first main body 50.

The position detecting unit may be provided with the magnets 92a mounted on the lower and upper portions of the second main body 60 and the magnet detecting sensor 94a installed on the portion of the first main body 50 to detect the magnetic field formed by one of the magnets 92a as shown in FIGS. 4 and 9.

Since the position detecting unit is described in conjunction with FIGS. 4 and 9, detail descriptions of the position detecting unit will be omitted.

The elastic member 84' elastically supports the motor M' to bind the male cam 80' and the female cam 82' to rotate the friction member 300 during the sliding operation of the second main body 60.

The elastic member 84' is compressed to release the male cam 80' and the female cam 82' from a binding state according to the external force when the second main body 60 manually slides with respect to the first main body 50 by the external force of the user.

That is, when the second main body 60 starts sliding according to the external force, the female cam 82' rotates, and the elastic member 84' is compressed to release the binding state of the mail cam 80' and the female cam 82' due to the external force, which is greater than the elastic force of the elastic member 84'.

In other word, the female cam 82' rotates by the external force while the male cam 80' resists against the rotation of the female cam 82' not to rotate. Due to this resistance of the male cam 80', the male cam 80' slides with respect to the female cam 82' through the tapered surface.

The elastic force of the elastic member 84' may be greater than the rotation force of the first shaft S of the motor M' and less than the external force by the user to enable the automatic and manual sliding operation of the second main body 60.

Figure 11:
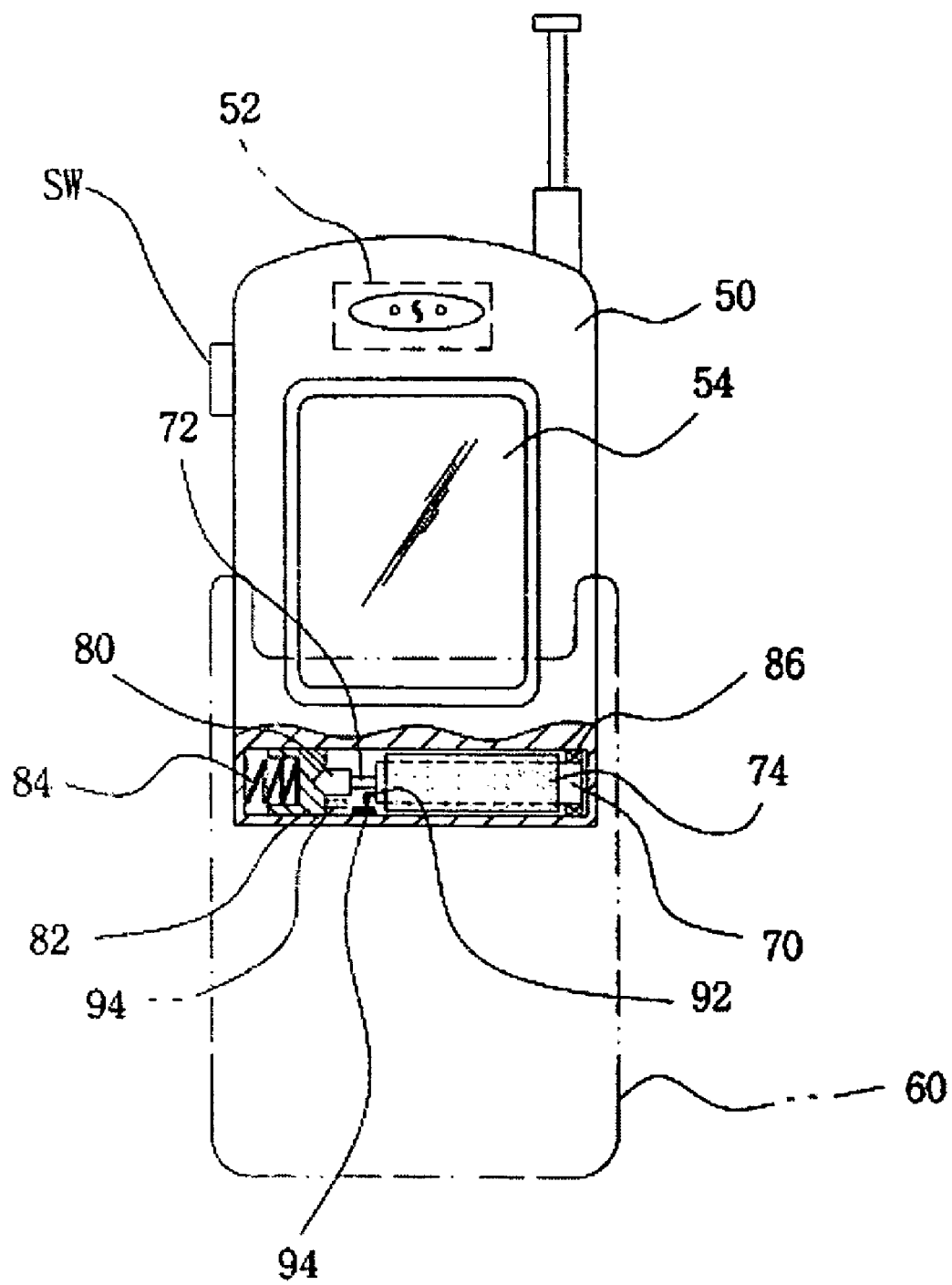
FIGS. 11 and 12 are front and side views having a partial sectional view showing another sliding unit of the slide type cellular phone of FIG. 2 according to another embodiment of the present invention.
Figure 12:
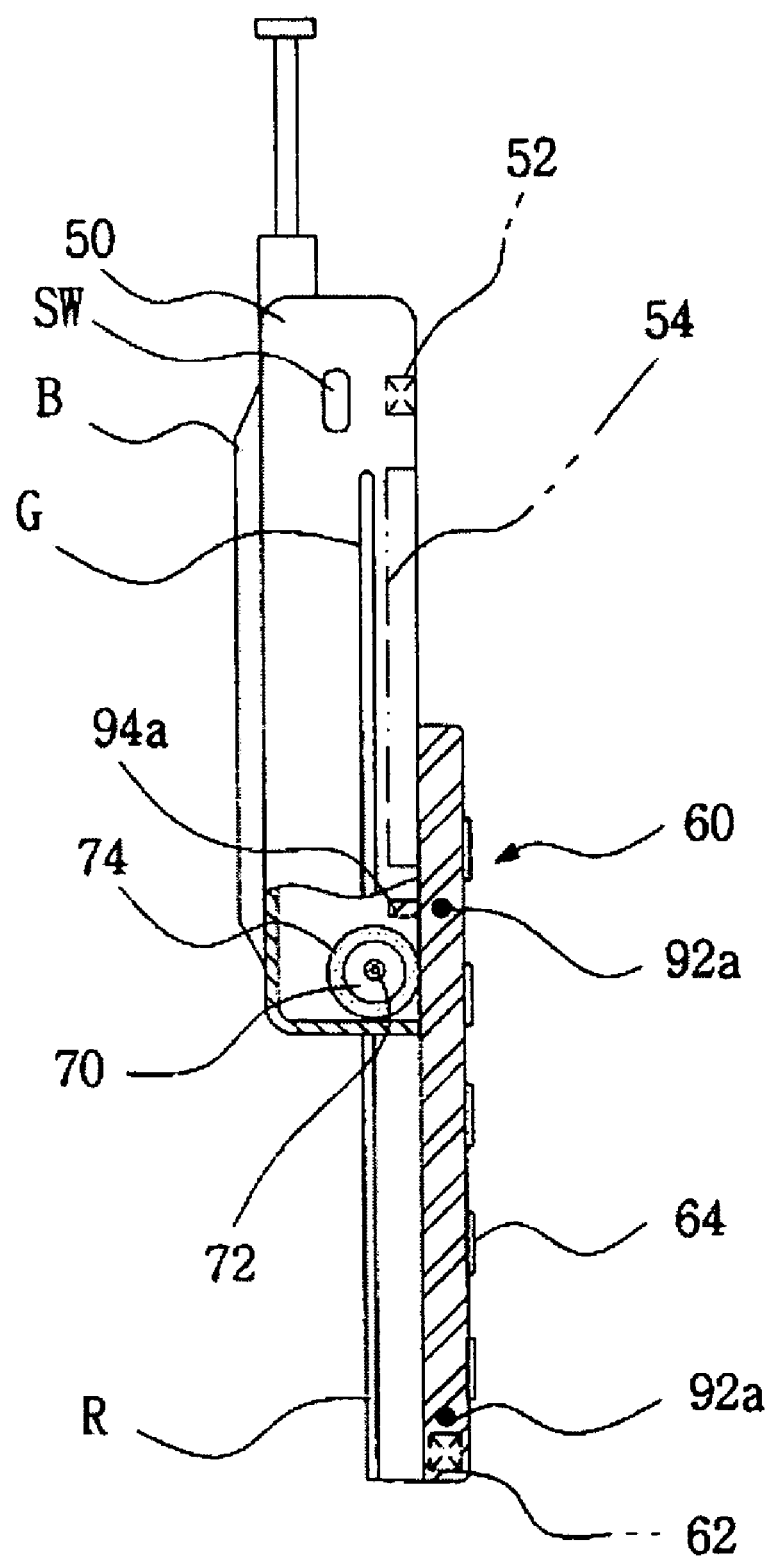
Figure 13:
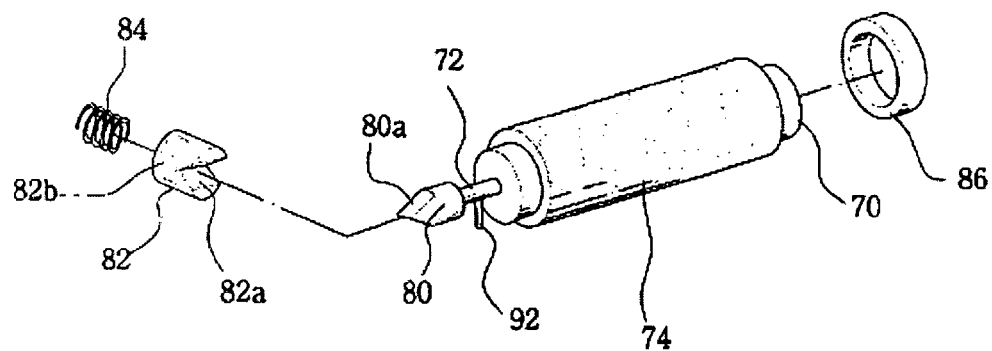
FIG. 13 is an exploded view showing a sliding unit of the slide type cellular phone shown in FIG. 11.

FIGS. 11 and 12 are front and side views having a partial sectional view showing another sliding unit 100 of the slide type cellular phone of FIG. 2 according to another embodiment of the present invention. FIG. 13 is an exploded view showing the sliding unit 100 of the slide type cellular phone shown in FIG. 11. the cellular phone shown in FIGS. 11 through 13 has the similar structure as the previously shown cellular phone.

The second main body 60 includes a structure to be slidably coupled to the first main body 50. The first main body 50 includes various receiving and transmitting components, a speaker 52, a battery pack B as a power source, a display window 54 displaying various telecommunication and function information, a guide G guiding the second main body to slide with respect to the first main body 50, and a switch SW to control sliding of the second main body 60. The second main body 60 includes a microphone 62, a key pad having a plurality of keys, various components (not shown), and a rail GR which is inserted into (disposed on) the guide G of the first main body 50.

The switch SW is electrically coupled to the sliding unit 100 which controls the second main body 60 to slide with respect to the first main body 50, and the sliding unit 100 includes a motor 70 having a circular cylindrical shape and disposed in an inside of the first main body 50 to rotate in forward and reverse directions, and a pulley 74 made of a rubber material and surrounding an outer circumferential surface of the motor 72.

The pulley 74 is attached to the motor 70, installed in the inside of the first main body 50, and has an outer circumferential surface having a portion contacting a portion of a surface of the second main body 60.

The first shaft 72 of the motor 70 is fixedly coupled to a fixed (stationary) unit of the first main body 50, which includes an elastic member 84 and male and female cams 80 and 82 which will be described later, not to be rotatable with respect to the fixing unit. Since a rotation shaft 72 of the motor M is firmly secured on the fixed unit, the motor 70 is rotates, and the pulley 74 attached to the motor 70 rubs against the second main body 60.

That is, when an electrical power is supplied to the motor 70 according to the switch signal of the switch SW, the motor 70 rotates with respect to the rotation shaft 72, the pulley 74 is rotated by a rotation of the motor 70 to generate a friction force with the second main body 60, and then the friction force causes the second main body 60 to slide with respect to the first main body 50.

The motor 70 includes a speed reduction unit having satellite gears having a speed reduction ration of 500~600:1 to generate a rotation torque to realize the sliding operation of the second main body 60 with respect to the first main body 50.

In addition, a surface of the pulley 74 attached to the motor 70 is formed with a plurality of grooves (not shown) in a lengthwise or widthwise direction or a plurality of embossments protruding from the surface of the pulley to increase the friction force.

The fixed unit fixedly coupled to the rotation shaft 72 of the motor 70 includes the male cam 80 and the female cam 82. The male cam 80 includes one end having a projection 80a having tapered surfaces formed on both sides thereof and the other end fixedly coupled to the rotation shaft 72 of the motor 70. The female cam 82 includes one end having a groove 82a corresponding to the projection 80a and the other end having a cavity 82b.

The elastic member 84 is disposed in the cavity 82b of the female cam 82 in an extension state while one end of the elastic member 84 is coupled to an inside wall of the first main body 50 and the other end is coupled to a side of the female cam 82 defining the cavity 82b, thereby elastically supporting the female cam 82.

Since the projection 80a of the male cam 80 is inserted into the groove 82a of the female cam 82, the male cam 80 and the female cam 82 maintain bound together without being separated.

Since the elastic member 84 elastically supports the female cam 82 to be elastically coupled to the male cam 80, the male cam 80 is bound to the female cam 82, thereby fixedly coupling the roration shaft 72 of the motor 70 to the fixed unit.

Accordingly, when the motor 70 is activated to rotate, the roration shaft 72 of the motor 70 is not rotated because the roration shaft 72 is bound to the female cam 82. Rather, the motor 70 rotates with respect to the roration shaft 72 bound to the female cam 82. Therefore, the motor 70 becomes a rotor while the roration shaft 72 becomes a stator.

In order to prevent a rotation force to rotate the rotation shaft 72 (stator) of the motor 70 with respect to the fixed unit, the female cam 82 needs to overcome the rotation force, and an elastic force of the elastic member 84 to elastically support the female cam 82 should be greater than the rotation force of the rotation shaft 72.

That is, the elastic member 84 has the elastic force greater than the rotation force of the rotation shaft 72.

However, the elastic force of the elastic member 84 should be less than an external force transmitted to the elastic member 84 to compress the elastic member 84 when the external force is generated when the second main body 60 slides with respect to the first main body 50, although the elastic force of the elastic member 84 is greater than the rotation force of the rotation shaft 72.

That is, when a user manually slides the second main body 60 with respect to the first main body 50, the elastic member 84 should be compressed to prevent a breakage of the male cam 80 and the female cam 82.

The sliding operation of the second main body 50 will be explained in more detail hereinafter. When the second main body 60 slides by the user manually, the pulley 74 and the motor 70 are rotated by the second main body 60, and the rotation of the motor 70 causes the rotation shaft 72 to rotate.

And then, the female cam 82 is about to rotate when the male cam 80 coupled to the rotation shaft 72 is rotated. If the elastic member 84 is compressed, the male cam 80 and the female cam 82 are released from each other.

If the elastic member 84 is not compressed, the female cam 82 is bound to the male cam 80, thereby not allowing the second main body 60 to slide with respect to the first main body 50, so that the external force is exerted on the male cam 80 and the female cam 82, and then the male cam 80 and the female cam 82 are damaged and broken down.

However, if the elastic member 84 is compressed to release the male cam 80 and the female cam 82 from each other, the projection of the male cam 80 is released from the groove of the female cam 82 to pivot with respect to the groove of the female cam 82, thereby smoothly rotating the male cam 80 with respect to the female cam 82.

Accordingly, it is possible that the second main body 60 is manually slid with respect to the first main body 50 using the compression of the elastic member 84.

Here, a reference number 86 indicates a bearing having a ring shape inserted around an end portion of the motor 70 to rotatably support the motor 70 and enabling the motor 70 to smoothly rotate.

It is possible that a position detecting unit is provided to detect a state of the sliding operation of the second main body 60 with respect to the first main body 50 to automatically control the rotation of the motor 70.

The position detecting unit includes a protrusion 92 mounted on a portion of the motor 70 or the rotation shaft 72 to rotate together with the motor 70 or the rotation shaft 72, and a position detecting sensor 94 disposed to face the protrusion 92 to detect a rotation state of the protrusion 92 as shown in FIG. 11.

The position detecting sensor 94 is a contact type switch to contact the protrusion 92. However, the invention is not limited thereto. The position detecting sensor 94 may be a noncontact type switch, such as a photo sensor detecting the protrusion 92 using laser. Moreover, the position detecting sensor 94 can be disposed on an inside wall of the first main body 50 or a portion of the female cam 82 which is not rotatable with respect to the first main body 50.

The position detecting sensor 94 is electrically connected to an IC (not shown) which calculates the number of the rotation of the protrusion 92 to control a power of the motor 70 and the rotation of the motor 70.

That is, since the rotation number of the protrusion 92 indicates the rotation number of the motor 70, the sliding state of the second main body 60, that is, an open state and a closed state of the first main body 50, is detected by the rotation number of the protrusion 92, that is, the rotation number of the motor 70. therefore, the power is supplied to the motor 70 or the supplying of the power to the motor 70 is terminated according to the rotation number of the protrusion 92 or the motor 70.

The position detecting unit may includes magnets 92a mounted on lower and upper portions of the second main body 60 and a magnet detecting sensor 94a installed on a portion of the first main body 50 to detect a magnetic field formed by one of the magnets 92a as shown in FIG. 12.

If the position detecting unit is provided with the magnets 92a and the magnet detecting sensor 94a as described above, the magnet detecting sensor 94a and one of the magnets 92a are disposed to close to each other during the sliding operation of the second main body 60, and the IC connected to the magnet detecting sensor 94a controls the rotation of the motor 70.

Accordingly, the second main body 60 accurately slides with respect to the first main body 50 to open and close the first main body 50.

As described above, in the cellular phone according to this embodiment of the invention, the sliding operation of the second main body 60 is performed by using the motor 70 and the pulley 74 as the sliding unit 100. However, the sliding operation can be performed using another embodiment of the present invention as shown in FIG. 14.

Figure 14:
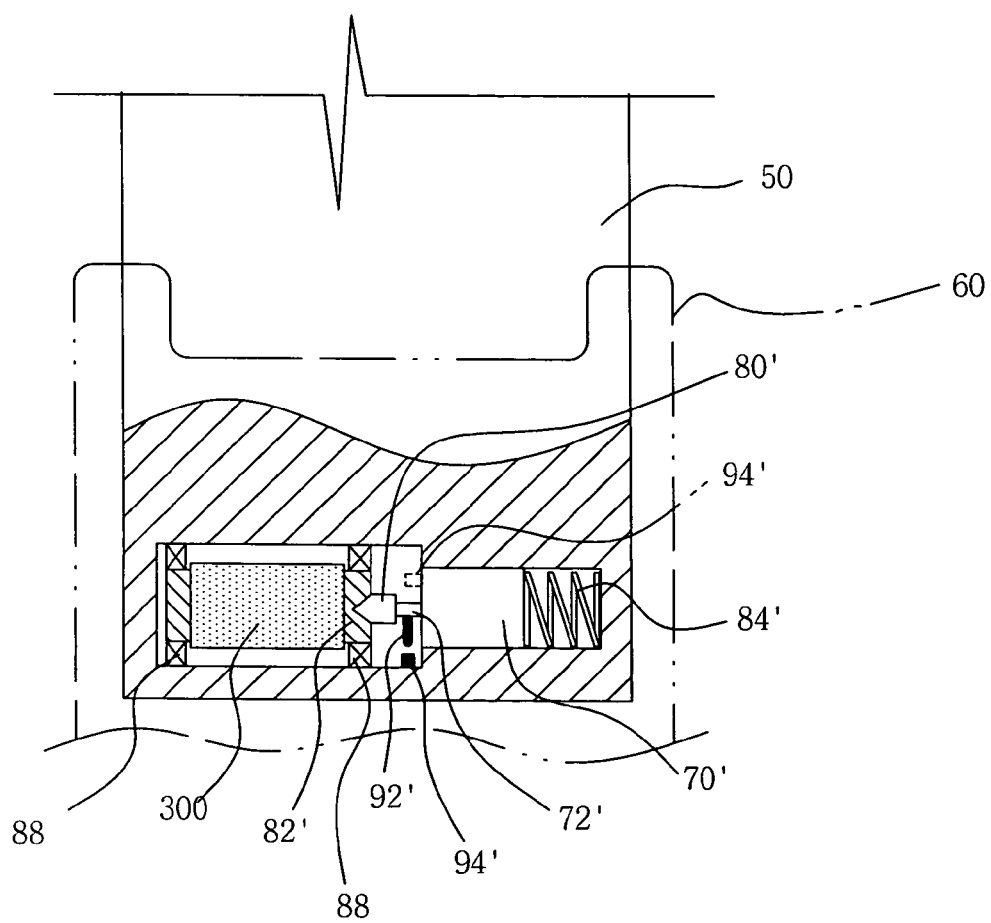
FIG. 14 is a partial sectional view showing the sliding unit of the slide type cellular phone shown in FIG. 11.

FIG. 14 is a view having a partial sectional view showing another sliding unit 100 of the slide type cellular phone of FIGS. 2 and 11 according to another embodiment of the present invention. The cellular phone includes a motor 70' fixedly mounted on an inside of the first main body 50, a power transmitting member (80', 82') coupled to the motor 70', and a friction member 300 contacting an inside wall of the second main body 60 to slide the second main body with respect to the first main body 50.

An exterior shape of the motor 70' is a hexahedral shape to be installed on the inside of the first main body 50, one end of the motor 70' is coupled to an end of the power transmitting member, such as the male cam 80' and the female cam 82', and the other end of the female cam 82' is provided with an elastic member 84' made of a compression spring in an extended state.

The elastic member 84' has one end fixedly coupled to the motor 70' and the other end fixedly mounted on the inside wall of the first main body 50 to elastically support the motor 70' to bind the male cam 80' and the female cam 82'.

The friction member 300 to slide the second main body 60 may be a pulley made of the rubber material surrounding an outer surface of the female cam 82' or a roller made of the rubber material fixed on the female cam 82'.

The friction member 300 may includes a plurality of grooves formed on an outer surface thereof and a plurality of embossments minutely protruding from the outer surface of the friction member 300 to increase a friction force.

Since the friction member 300 has a portion being close contact with a surface of the second main body 60 to slide the second main body 60 with respect to the first main body 50.

A fixed unit 88, such as a ring-shaped bearing, is mounted on a first side and/or second side of the friction member 300 to rotatably support the friction member 300.

In the cellular phone having the above structure, when an external power is supplied to the motor 70', which is the stator, and then, the rotation shaft 72', which is the rotor, is rotated according to a rotation of the motor 70'. As a consequence, the male cam 80' and the female cam 82' are rotated to cause a rotation of the friction member 300 which is formed in a single body with the female cam 82'.

When the friction member 300 rotates, the second main body 60 slides with respect to the first main body 50 according to a friction force generating between the friction member 300 and the second main body 60.

In order to automatically control the sliding operation of the second main body 60, the position detecting unit is provided as shown in FIG. 10. The position detecting unit includes a protrusion 92' formed on a rotation shaft 72 of the motor 70' and a position detecting sensor 94' mounted on the inside wall of the first main body 50.

The position detecting sensor 94' may be mounted on a portion of the motor 70' which is indicated with a dotted-lined box rather than the inside wall of the first main body 50.

The position detecting unit may be provided with the magnets 92a mounted on the lower and upper portions of the second main body 60 and the magnet detecting sensor 94a installed on the portion of the first main body 50 to detect the magnetic field formed by one of the magnets 92a as shown in FIGS. 4, 9, and 12.

Since the position detecting unit is described in conjunction with FIGS. 4, 9 and 12, detail descriptions of the position detecting unit will be omitted.

The elastic member 84' elastically supports the motor 70' to bind the male cam 80' and the female cam 82' to rotate the friction member 300 during the sliding operation of the second main body 60.

The elastic member 84' is compressed to release the male cam 80' and the female cam 82' from a binding state according to the external force when the second main body 60 manually slides with respect to the first main body 50 by the external force of the user.

That is, when the second main body 60 starts sliding according to the external force, the female cam 82' rotates, and the elastic member 84' is compressed to release the binding state of the mail cam 80' and the female cam 82' due to the external force, which is greater than the elastic force of the elastic member 84'.

In other word, the female cam 82' rotates by the external force while the male cam 80' resists against the rotation of the female cam 82' not to rotate. Due to this resistance of the male cam 80', the male cam 80' slides with respect to the female cam 82' through the tapered surface.

The elastic force of the elastic member 84' may be greater than the rotation force of the rotation shaft 72 of the motor 70' and less than the external force by the user to enable the automatic and manual sliding operation of the second main body 60.

As described above, in the cellular phone according to embodiments of the present invention, the second main body 60 can easily slide with respect to the first main body 50 using the friction force between the second main body 60 and the friction member 300.

This provides the cellular phone with a very convenient structure with which the user may automatically and manually slide the second main body 60 with respect to the first main body 50.

Figure 15:
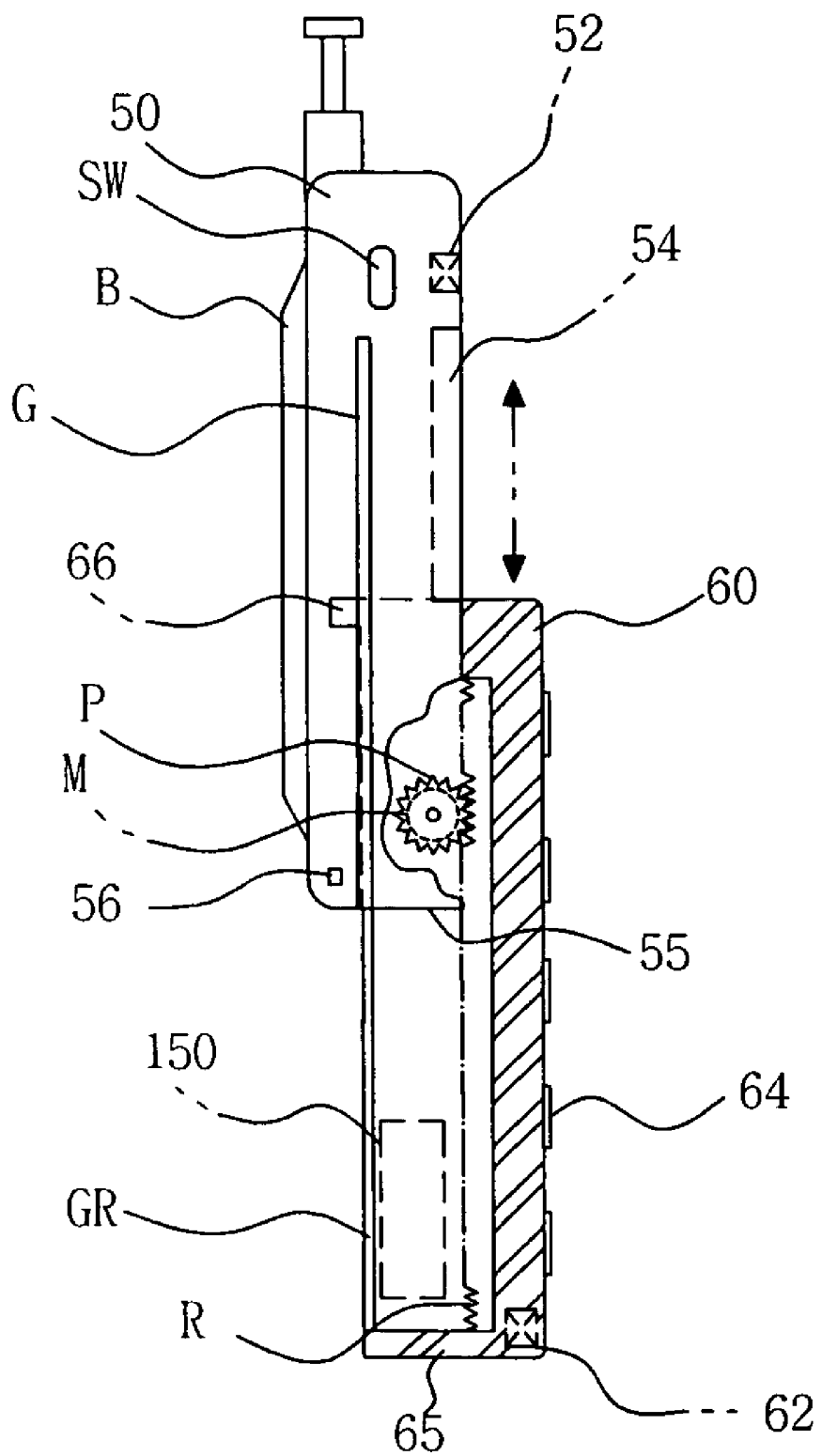
FIG. 15 is a side view having a partial sectional view showing of another sliding unit of the slide type cellular phone of FIG. 2 according to another embodiment of the present invention.
Figure 16:
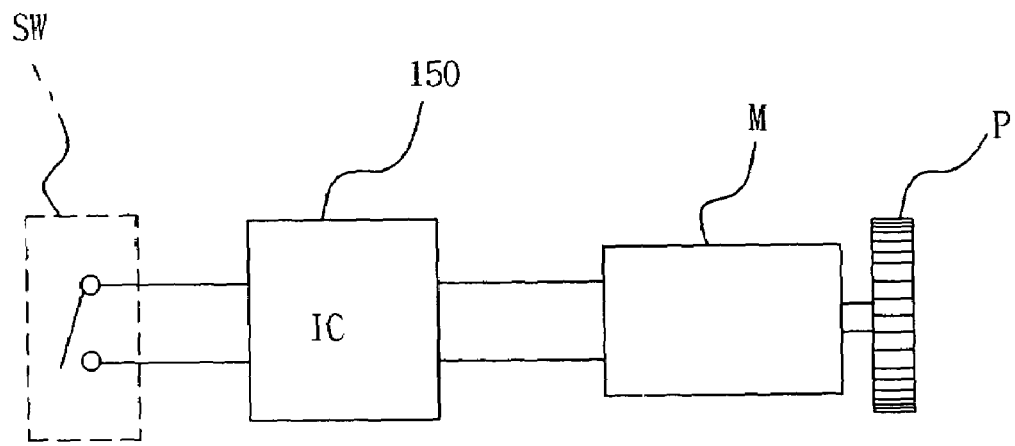
FIG. 16 is a view showing relationships among a switch, a motor control unit, and a motor of the slide type cellular phone of FIG. 15.
Figure 17:
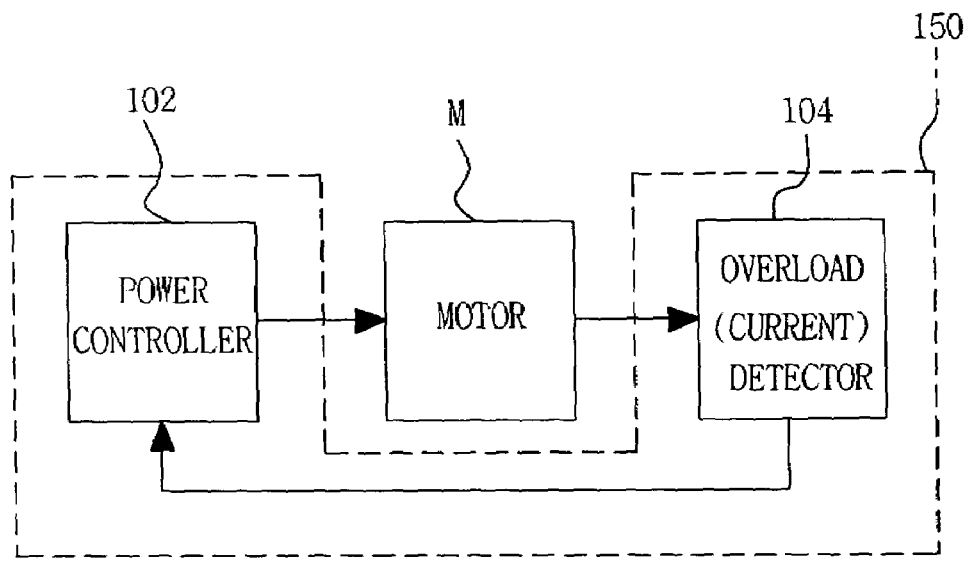
FIG. 17 is a view showing the motor control unit of the slide type cellular phone shown in FIG. 16.

FIG. 15 is a side view having a partial sectional view showing of another sliding unit 100 of the slide type cellular phone of FIGS. 2 and 4 according to another embodiment of the present invention. FIG. 16 is a view showing relationships among a switch SW, a motor control unit 150, and a motor M of the slide type cellular phone of FIG. 15. FIG. 17 is a view showing the motor control unit 150 of the slide type cellular phone shown in FIG. 16.

The cellular phone includes the first main body 50 and the second main body 60. The first main body 50 includes an LCD display 54, the speaker 52, and the battery pack B, and the second main body 60 includes the microphone 62, the key pad 64, and a structure slidably coupled to the first main body 50.

A plurality of guide grooves G are formed on both insides of the first main body 50, and guide rails GR are formed on both insides of the second main body 60 to correspond to the guide grooves G. Since the guide rails GR are coupled to corresponding ones of the guide grooves G, the second main body 60 slides with respect to the first main body 50.

On a lower portion of the first main body 50 is provided the stopper 56, and on an upper portion of the second main body 60 is provided the coupling member 66. When the second main body 60 slides in a lower direction, the second main body 60 is prevented from being separated from the first main body 50 during the sliding operation because of a coupling state of the stopper 56 and the coupling member 66.

When the second main body 60 slides in an upper direction, the downward wall 65 of the second main body 60 is coupled to the upward wall 55 of the first main body 50, thereby preventing the second main body 60 from being separated from the first main body 50.

The first main body 50 includes the motor M having the pinion P, a motor control unit 150 formed of an IC to control a rotation of the motor M electrically connected to the IC, and the switch SW protruding from a surface of the cellular phone and electrically coupled to the motor control unit 150.

The second main body 60 includes the rack R corresponding to the pinion P of the first main body 50, and the second main body 60 automatically slides with respect to the first main body 50 in another coupling state of the rack R and the pinion P.

When the switch SW is activated to generate a driving (control) signal to the motor to supply the power to the motor M to rotate the motor M, the pinion P is rotated by a rotation of the motor M to control the rack R to reciprocate with respect to the pinion P, and the second main body 60 slides with respect to the first main body 50 according to a reciprocation operation of the rack R.

The motor control unit 150 includes an overload detector 104 and a power controller 102 as shown in FIG. 17. When the overload detector 104 detects an overload current of the motor M in the motor control unit 150, the sliding operation of the second main body 60 is terminated immediately by terminating the rotation of the motor M.

The power controller 102 is electrically connected to the switch SW to supply the power (current) to the motor M or cut off the power from the motor M according to the switch SW, and the overload detector 104 is electrically connected to the motor M and the power controller 102 to detect an overload (current) of the motor M.

The overload detector 104 output an overload signal to the power controller 102 when detecting the overload (current) greater than a predetermined current of a normal operation of the motor M. The power controller 102 cuts off the power (current) from the motor M according to the overload signal of the overload detector 104.

Since the motor M is stopped by the power controller 102, the motor M is prevented from being overloaded, and the sliding operation of the second main body 60 is terminated.

The overload of the motor M occurs when the second main body 60 is prevented from sliding with respect to the first main body 50 due to an interference between the coupling member 66 or the guide rail GR of the second main body 60 and stopper 56 or the guide groove G of the first main body 50.

In other word, although the motor M operates according to an optimum current enough to slide the second main body 60 with respect to the first main body 50 during the sliding operation of the second main body 60, the overload is generated when the motor M cannot rotate due to the interference between the coupling member 66 or the guide rail GR of the second main body 60 and stopper 56 or the guide groove G of the first main body 50. Therefore, the overload detector 104 can detect the overload of the motor M.

The cellular phone having the motor control unit 150 turns on the power controller 102 according to an operation of the switch SW to supply the power through the switch to the power controller 102, and the power controller 102 supplies the power (current) to the motor M in an on state.

When the pinion P and the rack R operate according to the rotation of the motor M to slide the second main body 60, the second main body 60 slides until the first main body 50 is completely opened or closed. The sliding operation of the second main body 60 is prevented when the guide rail GR or the coupling member 66 of the second main body 60 is coupled to an end portion of the guide groove G or the stopper 56 of the first main body 50.

That is, the second main body 60 is stopped during the sliding operation when the second main body 60 is caught by the end portion of the guide groove G or the stopper 56 of the first main body 50.

When the sliding operation of the second main body 60 is stopped, the overload occurs from the motor M, causing the overload detector 104 to detect the overload to output the overload signal to the power controller 102.

According to the overload signal, the power controller 102 is turned off to cut off the power (current) from the motor M, thereby terminating the sliding operation of the second main body 60.

Accordingly, since the motor control unit 150 having the above structure as shown in FIG. 17, can prevent the motor M from being overloaded by the overload, the sliding operation of the second main body 60 can be automatically terminated without manipulation of any key or the switch SW. And also, a conventional limit switch activated by a sliding movement of the second main body 60 is not necessary.

Figure 18:
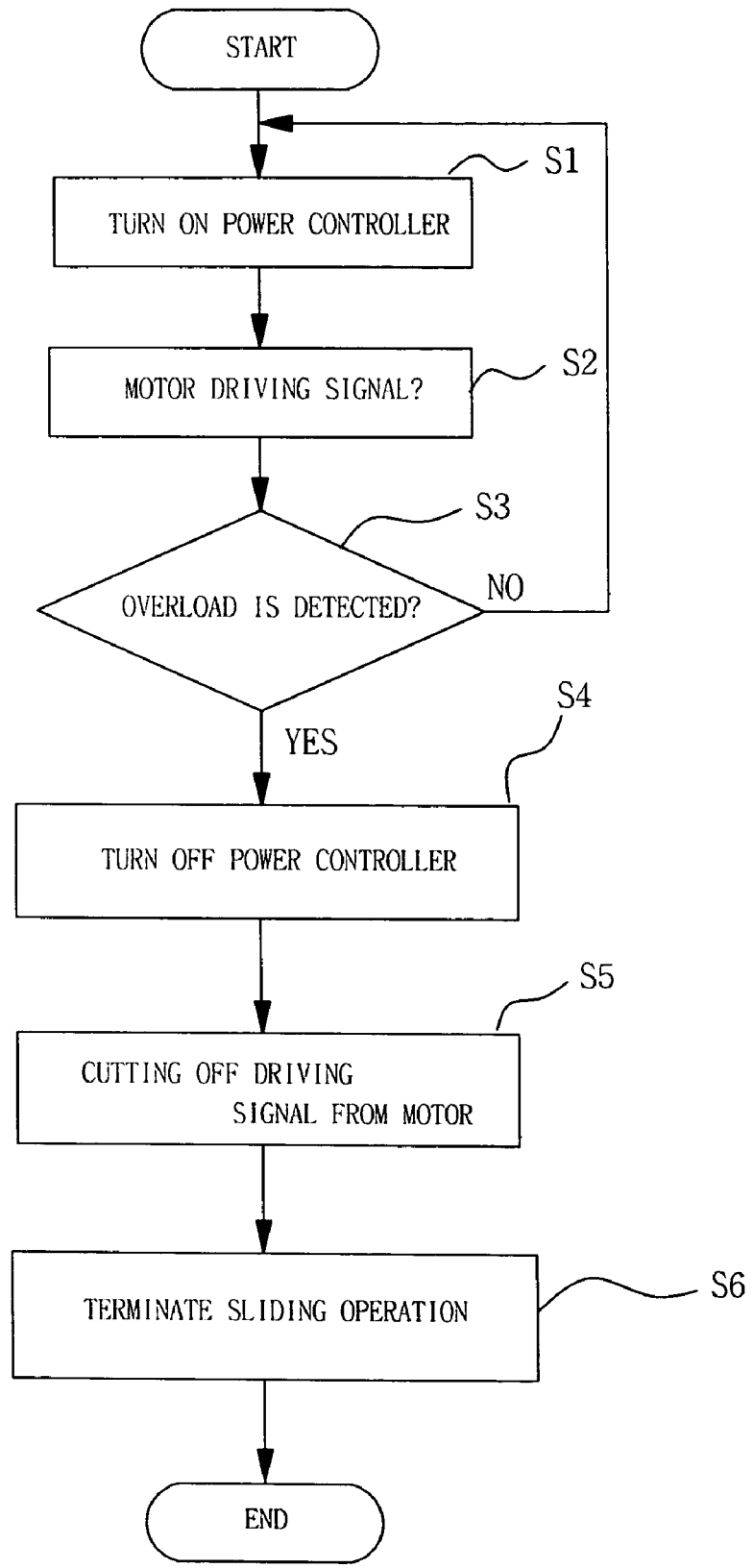
FIG. 18 is a flowchart showing a method of sliding a second main body with respect to a first main body using the motor control unit of the FIG. 17.

An automatic sliding method of the slide-type cellular phone having the motor control unit 150 as shown in FIG. 17 will be explained with reference to FIG. 18. FIG. 18 is a flowchart showing a method of sliding the second main body 60 with respect to the first main body 50 using the motor control unit 150 of the FIG. 17.

The method includes turning on the power controller 102 according to the manipulation (driving signal) of the switch SW to control the current to flow through the power controller 102 in operation S1, and controlling the motor to rotate according to the on state of the power controller 102 to slide the second main body 60 with respect to the first main body 50 in operation S2.

The method further includes detecting the overload (current) of the motor M generated when the sliding operation of the second main body 60 is prevented by the first main body 50 in operation S3, and turning off the power controller when the overload is detected in operation S4.

The method also includes cutting off the power (driving signal) from the motor M according to the off state of the power controller in operation S5, and terminating the sliding operation of the second main body 60 by stopping the motor M according to a rotation prevention signal of the motor M.

According to the operations S1 through S6 of the sliding method of cellular phone, the sliding operation of the second main body 60 is automatically controlled by detecting the overload of the motor M.

Figure 19:
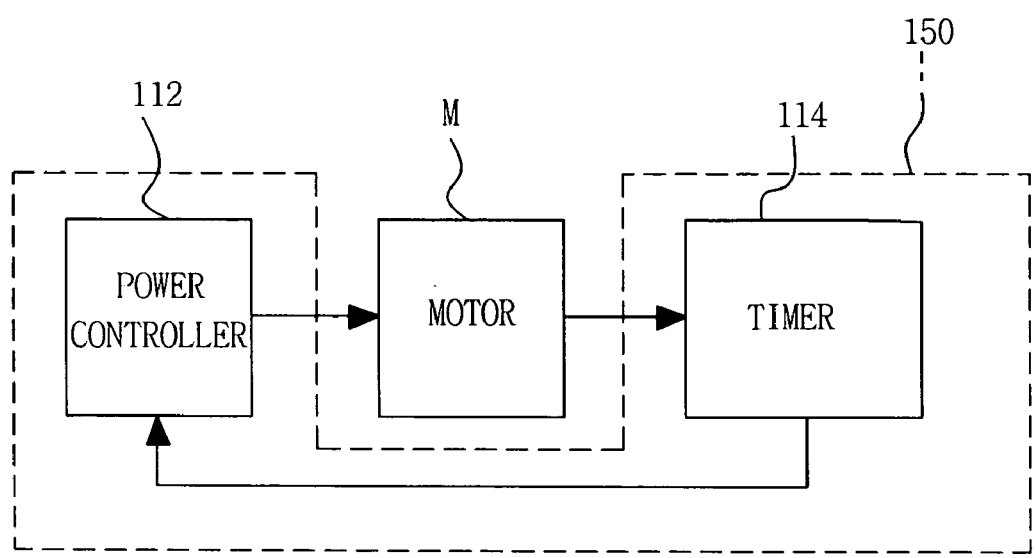
FIG. 19 is a a view showing another motor control unit of the slide type cellular phone shown in FIG. 16 according to another embodiment of the present invention.

FIG. 19 is a a view showing another motor control unit 150 of the slide type cellular phone shown in FIGS. 16 and 17 according to another embodiment of the present invention. If the cellular phone is provided with the motor control unit 150 as shown in FIG. 19, the motor M rotates during a predetermined period of time without being overloaded, and the sliding operation of the second main body 60 can be automatically terminated.

Referring to FIG. 19, the motor control unit 150 includes a power controller 112 electrically connected to the switch SW to supply the current flowing through the switch SW to the motor M or cut off the current from the motor M, and a timer 114 electrically connected to the motor M and the power controller 112 to operate according to the activation (rotation) of the motor M.

A predetermined activation (rotation) period of the motor M is set in the timer 114 to count the rotation period. The timer 114 generates a count completion signal to the power controller 112 according to the completion of the counting the rotation period.

The power controller 112 cuts off the power (current) from the motor M to stop the rotation of the motor M so that the motor M is prevented from being overloaded. The sliding operation of the second main body 60 is automatically terminated according to the stoppage of the motor M.

The rotation period of the motor M set in the timer 114 is a time period taken by the second main body 60 completely opening or closing the first main body 50. Therefore, the second main body 60 can completely open or close the first main body 50 by sliding with respect to the first main body 50 during the operation (rotation) of the motor M.

The cellular phone having the motor control unit 150 as described above, turns on the power controller 112 by the manipulation (driving signal) of the switch SW to allow the current to flow through the switch SW and the motor M, and the power controller 112 supplies the current to the motor M to rotate the motor M when being turned on.

The timer 114 and the motor M operate at the same time, and the pinion P and the rack R operates by the rotation of the motor M to cause the second main body 60 to slide with respect to the first main body 50.

The timer 114 outputs the count completion signal to the power controller 112 when the counting of the rotation period is completed. The power controller 112 is turned off to cut off the power from the motor M according to the count completion signal of the timer 114.

When the power is cut off from the motor M, the rotation of the motor M is stopped, and the sliding operation of the motor M is terminated.

In the motor control unit 150 provided with the structure shown in FIG. 19, the motor M is rotated for the predetermined rotation period to terminate the sliding operation of the second main body 60 without manipulation of any separate switch, and the conventional limit switch activated by the sliding movement of the second main body 60 is not needed.

Figure 20:
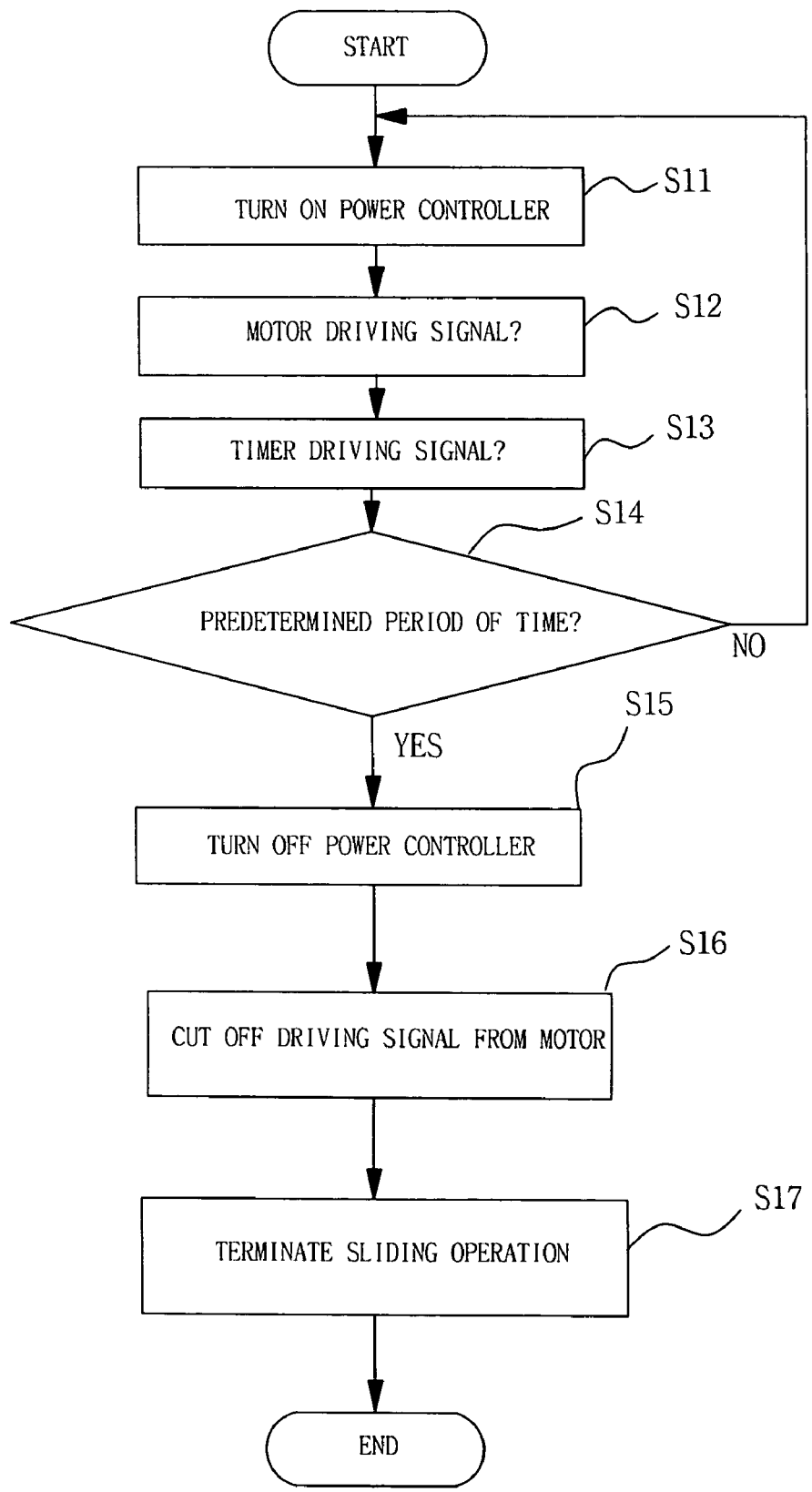
FIG. 20 is a flowchart showing a method of sliding a second main body with respect to a first main body using the motor control unit of the FIG. 19.

FIG. 20 is a flowchart showing a method of sliding the second main body 60 with respect to the first main body 50 using the motor control unit 150 of the FIG. 19. The method includes turning on the power controller 122 according to a control of the switch SW so that the current flows to the power controller through the switch SW in operation S11, transmitting a rotation signal to the motor M according to the on state of the power controller 112 in operation S12, and generating a driving signal to activate the timer 114 having the rotation period when the motor M rotates in operation S13.

The motor M rotates according to the rotation signal to slide the second main body 60, and the timer 114 counts the rotation period of the motor M.

When the counting of the rotation period of the motor M is completed in the timer 114, the timer 114 outputs the counting signal to the power controller 112 in operation S14.

When the power controller 112 receives the counting signal from the timer 114, the power controller 112 is turned off in operation S15. The power supplied to the motor M is cur off when the power controller 112 is turned off in operation S16. When the motor M is stopped in accordance with the stoppage of the driving signal to the motor M, the sliding operation of the second main body 60 is terminated in operation S17.

According to the operations S11 through S17 of the sliding method performed in the slide type cellular phone, the motor M is rotated for the predetermined rotation period so that the sliding operation of the second main body 60 is automatically controlled.

Figure 21:
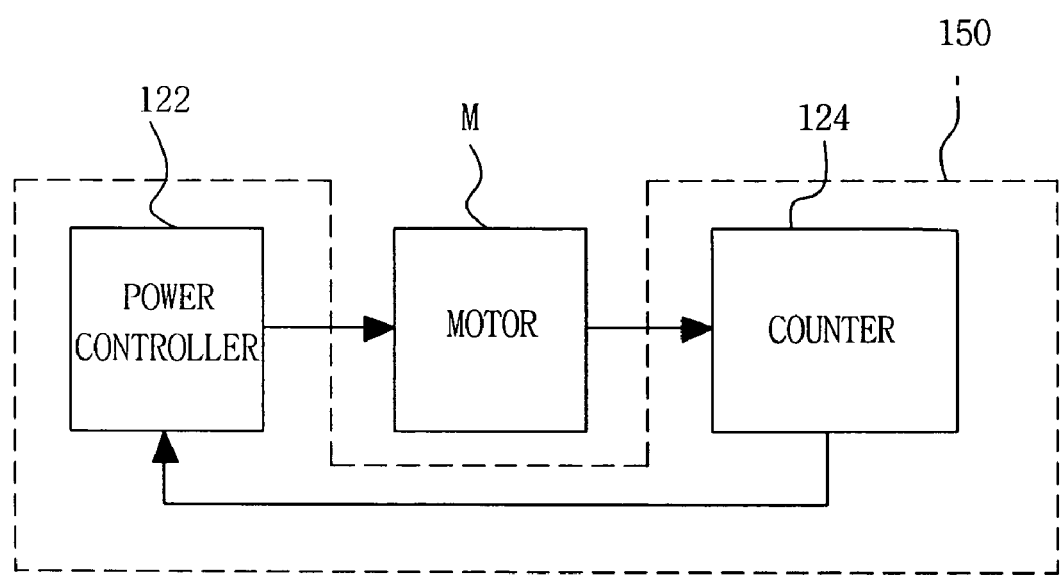
FIG. 21 is a a view showing another motor control unit of the slide type cellular phone shown in FIG. 16 according to another embodiment of the present invention.

FIG. 21 is a a view showing another motor control unit 150 of the slide type cellular phone shown in FIG. 16 according to another embodiment of the present invention. As shown in FIG. 21, the motor M rotates according to the predetermined rotation number, thereby preventing the motor M from being overloaded. Moreover, the sliding operation of the second main body can be automatically terminated.

The motor control unit 150 includes the power controller electrically connected to the switch SW to supply the current to the motor M or cut off the current from the motor M according to a switching operation of the switch SW, and a counter electrically connected to the motor M and the power controller 122 to be activated together with the activation of the motor M.

The rotation number of times of the motor M is set in the counter 124, and the counter counts the number of rotations of the motor M. When the counting of the number of rotations of the motor M is completed, a counting signal is outputted from the counter 124 to the power controller 122.

The power controller cuts off the power (current) from the motor M to stop the rotation of the motor M. Due to the stopping of the rotation of the motor M, the motor M is protected from being overloaded, and the sliding operation of the motor M is terminated.

The rotation number of the times set in the counter 124 is the number of times corresponding to a distance by which the second main body 60 completely opens or close the first main body 50 according to the motor M. Accordingly, during the rotation of the motor M according to the rotation number of times, the second main body 60 can completely open or cover the first main body 50.

The slide type cellular phone having the motor control unit 150 constructed according to the present invention turns on the power controller according to the switching signal of the switch SW, and the power controller 122 supplies the current to the motor M to drive the motor M while being in an on state.

The motor M and the counter 124 operate simultaneously, and the pinion P and the rack R are operated to cause the second main body 60 to slide with respect to the first main body 50 according to the rotation of the motor M.

The counter 124 counts the rotation number of times of the motor M to output the counting signal to the power controller 122, and the power controller is turned off to cut off the power (current) from the motor M according to the counting signal of the counter 124.

When the power is cut off from the motor M, the sliding operation of the second main body is terminated.

In the motor control unit having the above structure as shown in FIG. 21, the motor M is activated to rotate during the only predetermined rotation number of times. Therefore, the sliding operation can be automatically terminated, and the cellular phone does not need any additional switch which is turned on or off according to the sliding movement of the second main body 60.

Figure 22:
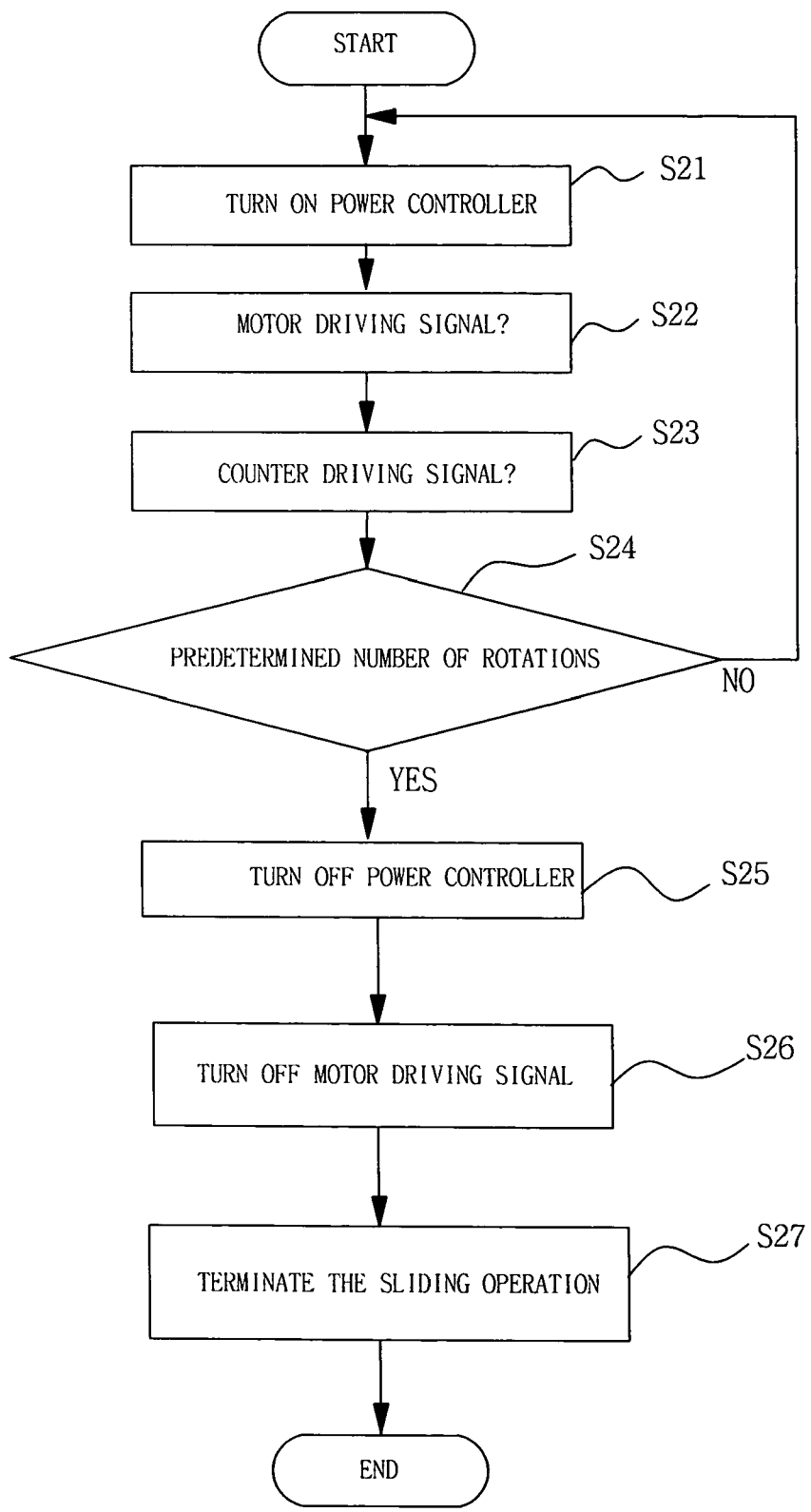
FIG. 22 is a flowchart showing a method of sliding a second main body with respect to a first main body using the motor control unit of the FIG. 21.

FIG. 22 is a flowchart showing a method of sliding the second main body with respect to the first main body using the motor control unit 150 of the FIG. 21.

The method includes turning on the power controller 122 according to a control of the switch SW so that the current flows to the power controller through the switch SW in operation S21, transmitting a rotation (driving) signal to the motor M according to the on state of the power controller 122 in operation S22, and generating an activation signal to activate the counter 124 having the rotation number of times when the motor M rotates in operation S23.

The motor M rotates according to the rotation number of times to slide the second main body 60, and the counter 124 counts the number of rotations of the motor M.

When the counting of the rotation number of times of the motor M is completed in the counter 124, the counter 124 outputs the counting signal to the power controller 122 in operation S24.

When the power controller 122 receives the counting signal from the counter 124, the power controller 122 is turned off in operation S25. The power supplied to the motor M is cut off when the power controller 122 is turned off in operation S26. When the motor M is stopped in accordance with the stoppage of the driving signal to the motor M, the sliding operation of the second main body 60 is terminated in operation S27.

According to the operations S21 through S27 of the sliding method performed in the slide type cellular phone, the motor M is rotated for the predetermined rotation number of times so that the sliding operation of the second main body 60 is automatically controlled.

Figure 23:
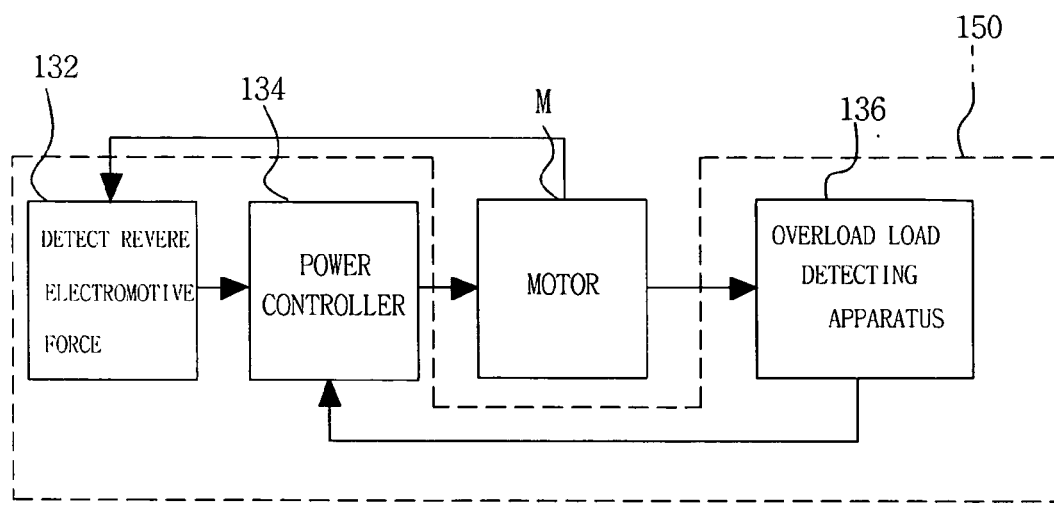
FIG. 23 is a a view showing another motor control unit of the slide type cellular phone shown in FIG. 16 according to another embodiment of the present invention.

FIG. 23 is a a view showing another motor control unit 150 of the slide type cellular phone shown in FIG. 16 according to another embodiment of the present invention. The switch SW may be installed on the second main body 60 rather than first main body 50 and automatically terminate the sliding operation of the second main body 60.

Referring to FIG. 23, the motor control unit 200 includes a reverse electromotive force detector 132 electrically connected to the motor M to detect a reverse electromotive force of the motor M, a power controller 134 electrically connected to the reverse electromotive force detector 132 and the motor M to supply the current to the motor M or cut off the current from the motor M, and an overload (current) detector 136 connected to the power controller 134 and the motor M to detect an overload (current) of the motor M and generate an overload detecting signal to the power controller 134.

Here, the reverse electromotive force detector 132 detects a reverse electromotive force of the motor M to output a reverse electromotive force detecting signal to the power controller 134, and the overload detector 136 detects the overload of the motor M to output the overload detecting signal to the power controller 134.

When the power controller 134 receives the reverse electromotive force detecting signal from the reverse electromotive force detector 132, the power controller 134 supplies the power (current) to the motor while the power controller 134 cuts off the power from the motor M when the overload detector 136 detects the overload of the motor M.

Accordingly, the power controller 134 cuts off the power not to be supplied to the motor M when the overload of the motor M is detected. The motor M is protected from being overloaded, and the sliding operation of the second main body 60 is terminated.

Meanwhile, the power controller 134 is electrically connected to the switch SW to supply the power to the motor M or cut off the power from the motor M according to an on/off control of the switch SW.

When the user manually slides the second main body 60, the pinion P and the rack R operate according to the manual sliding operation of the second main body 60, and the motor M generates the reverse electromotive force.

The reverse electromotive force generated from the motor M is detected by the reverse electromotive force detector 132, and the reverse electromotive force detector 132 outputs the reverse electromotive force detecting signal to the power controller 134.

The power controller 134 is turned on to supply the power (current) to the motor M, and then the motor M is activated to operate the pinion P and rack R to automatically slide the second main body 60.

When the second main body 60 slides to open or close the first main body 50, the guide rail R or the coupling member 66 is caught by the end portion of the guide groove G or the stopper 56 to stop the sliding operation.

The sliding operation of the second main body 60 stops when the second main body 60 is caught by the end portion of the guide groove G of the first main body 50.

When the sliding operation of the second main body 60 is stopped, the overload (current), which is greater than the normal power (current), is generated from the motor M. The overload detector 136 detects the overload of the motor M to output the overload detecting signal to the power controller 134.

The power controller 134 cuts off the power (current) from the motor M to stop the rotation of the motor M, and the sliding operation is terminated when the motor M is stopped.

In the motor control unit 15 having the above structure shown in FIG. 23, another switch SW can be mounted on the second main body 60. The sliding operation of the second main body 60 is terminated without the switching operation rather than any additional switch.

Figure 24:
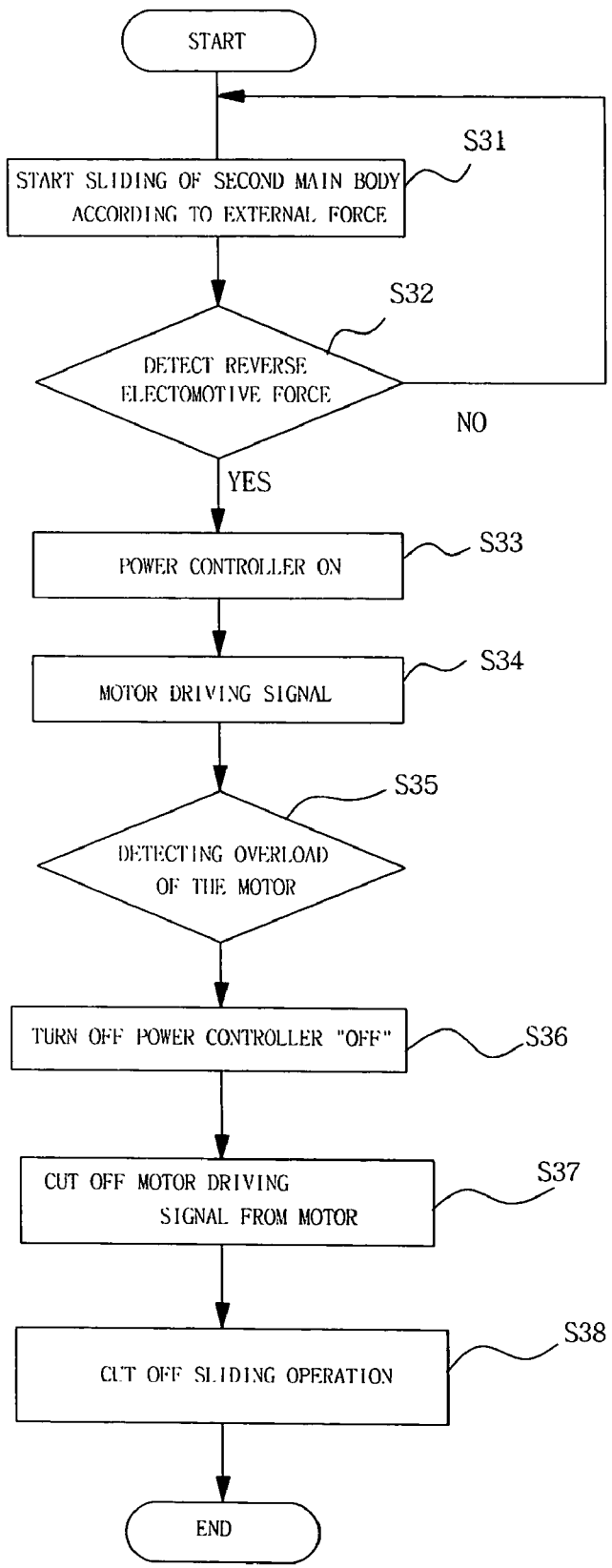
FIG. 24 is a flowchart showing a method of sliding a second main body with respect to a first main body using the motor control unit of the FIG. 23.

FIG. 24 is a flowchart showing a method of sliding the second main body 60 with respect to the first main body 150 using the motor control unit 150 of the FIG. 23. The second main body 60 slides according to an external force by a manual operation of the user to manually operate the motor M in operation S31. When the motor M rotates manually, the reverse electromotive force generated from the motor M is detected in operation S32.

The reverse electromotive force detecting signal is outputted to the power controller 134 so as to turn on the power controller 134 in operation S33. When the power controller 134 is turned on, the driving signal is transmitted to the motor M so that the motor M is rotated to slide the second main body 60 in operation S34.

The overload of the motor M occurring when the second main body 60 is prevented from sliding by the first main body 50, is detected in operation S35. And then, the power controller 134 is turned off when the overload of the motor M is detected inn operation S36.

The motor driving signal is blocked from being transmitted to the motor M when the power controller 134 is turned off in operation S37, and the motor M stops when the motor driving signal is not transmitted to the Motor M, so that the sliding operation of the second main body 60 is terminated in operation S38.

In the slide type cellular phone having the structure and the method of the operations S31 through S38 as described above, the reverse electromotive force generated from the motor M is detected when the second main body 60 manually slides according to the external force generated by the user manual operation so that the automatic sliding operation of the second main body 60 is realized, and the sliding operation of the second main body 60 is automatically terminated.

As described above, in the cellular phone constructed according to the above embodiments of the present invention, the second main body can manually or automatically slide with respect to the first main body according to the sliding unit having the rack and the pinion or the friction member, so that the user thereby providing a convenient cellular phone.

In addition, any additional operation of the switch to terminate the sliding operation of the second main body is not necessary, and any additional switch to terminate the sliding operation of the second main body is not necessary, thereby reducing a manufacturing cost of the cellular phone. Since the second main body can be used as the switch to control the motor to rotate, the user does not have to find out the switch to activate the motor, thereby providing a more convenient cellular phone.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed is:

1. A cellular phone, comprising:
   a first main body having a motor with a shaft, an elastic member elastically supporting the motor, and a switch activating the motor;
   a power transmitting unit coupled to the shaft of the motor to receive a rotation power from the motor;
   a pinion coupled to the power transmitting unit to be rotated by the rotation power;
   a second main body slidably coupled to the first main body, having a rack coupled to the pinion, and sliding with respect to the first main body according to movements of the pinion and the rack; and
   a sliding detecting unit detecting a termination of a sliding operation of the second main body to control the motor.

2. The cellular phone of claim 1, wherein the elastic member has an elastic force which is greater than the rotation power and less than an external force exerted on the second main body to slide with respect to the first main body, and which is extended to elastically support the motor in an automatic sliding operation of the second main body and is compressed to prevent a rotation of the motor in a manual sliding operation of the second main body.

3. The cellular phone of claim 1, wherein the power transmitting unit comprises:
   a pair of members facing each other to be selectively coupled to each other.

4. The cellular phone of claim 3, wherein the pair of members comprises:
   a male cam having one end coupled to the shaft of the motor and the other end formed with a projection having tapered surface formed on both sides thereof; and
   a female cam having one end formed with a groove corresponding to the projection of the male cam to be bound to the male cam, and the other end coupled to the pinion to rotate together with the pinion.

5. The cellular phone of claim 4, wherein the groove of the female cam comprises a groove having a linear shape.

6. The cellular phone of claim 4, wherein the groove of the female cam comprises a groove having a cross shape.

7. The cellular phone of claim 1, wherein the sliding detecting unit is provided in one of the first and second main bodies.

8. The cellular phone of claim 7, wherein the sliding detecting unit is provided in the first and second main bodies.

9. The cellular phone of claim 8, wherein the sliding detecting unit comprises:
   a plurality of sensors each having two contacts, activated when the two contacts come in contact with each other, and detecting the termination of the sliding operation of the second main body according to the contact between the two contacts.

10. The cellular phone of claim 9, wherein the sensors are installed on different portions of the first main body and each comprises a switching terminal operating by pressure, and the sliding detecting unit comprises a projection formed on the second main body and pushing the switching terminal to operate when the sliding operation of the second main body is terminated.

11. The cellular phone of claim 8, wherein the sliding detecting unit comprises:
   a plurality of noncontact sensors activated by a distance between the noncontact sensors and detecting the termination of the sliding operation of the second main body according to the activated noncontact sensors.

12. The cellular phone of claim 11, wherein the noncontact sensors are installed on the first main body and each comprises a hall element operating by a magnetic field, and the sliding detecting unit comprises a magnet disposed on the second main body to generate the magnetic field and disposed to face one of the noncontact sensors when the sliding operation of the second main body is terminated, to activate the one of the noncontact sensors.

* * * * *